(12) United States Patent
Kumar et al.

(10) Patent No.: US 12,244,468 B2
(45) Date of Patent: Mar. 4, 2025

(54) ARTIFICIAL INTELLIGENCE BASED ENHANCEMENTS FOR IDLE AND INACTIVE STATE OPERATIONS

(71) Applicant: QUALCOMM Incorporated, San Diego, CA (US)

(72) Inventors: Rajeev Kumar, San Diego, CA (US); Xipeng Zhu, San Diego, CA (US); Shankar Krishnan, San Diego, CA (US); Gavin Bernard Horn, La Jolla, CA (US); Ozcan Ozturk, San Diego, CA (US); Sitaramanjaneyulu Kanamarlapudi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 538 days.

(21) Appl. No.: 17/449,234

(22) Filed: Sep. 28, 2021

(65) Prior Publication Data

US 2023/0093963 A1 Mar. 30, 2023

(51) Int. Cl.
*H04L 1/16* (2023.01)
*H04L 41/16* (2022.01)
*H04W 24/10* (2009.01)
*H04W 76/27* (2018.01)

(52) U.S. Cl.
CPC ............ *H04L 41/16* (2013.01); *H04W 24/10* (2013.01); *H04W 76/27* (2018.02)

(58) Field of Classification Search
None
See application file for complete search history.

(56) References Cited

U.S. PATENT DOCUMENTS

| | | | |
|---|---|---|---|
| 2019/0037425 A1* | 1/2019 | Hong | H04W 72/23 |
| 2020/0413316 A1* | 12/2020 | Isaksson | H04W 36/30 |
| 2021/0064996 A1* | 3/2021 | Wang | H04W 24/08 |
| 2021/0258984 A1* | 8/2021 | Lai | H04W 28/0268 |
| 2022/0108214 A1* | 4/2022 | Lee | G06N 20/20 |
| 2022/0115009 A1* | 4/2022 | Sharifi | G10L 15/22 |

(Continued)

FOREIGN PATENT DOCUMENTS

| | | |
|---|---|---|
| EP | 4054244 A1 | 9/2022 |
| WO | WO-2020122669 A1 | 6/2020 |
| WO | WO-2021107608 A1 | 6/2021 |

OTHER PUBLICATIONS

International Search Report and Written Opinion—PCT/US2022/075371—ISA/EPO—Dec. 8, 2022.

*Primary Examiner* — Liem H. Nguyen
(74) *Attorney, Agent, or Firm* — Norton Rose Fulbright US LLP/Qualcomm Incorporated

(57) ABSTRACT

This disclosure provides systems, methods, and devices for wireless communication that support AI model-based enhancements for RRC IDLE and INACTIVE state operations. In a first aspect, a method of wireless communication includes receiving, by a wireless communication device, artificial intelligence (AI) model configuration information for IDLE/INACTIVE state procedures; retrieving, by the wireless communication device, an AI model for IDLE/INACTIVE state procedures based on the AI model configuration information; and performing, by the wireless communication device, one or more IDLE/INACTIVE state procedures based on the AI model. Other aspects and features are also claimed and described.

30 Claims, 14 Drawing Sheets

(56) References Cited

U.S. PATENT DOCUMENTS

| | | | | |
|---|---|---|---|---|
| 2022/0138621 A1* | 5/2022 | Patil | ............... | G06N 3/084 |
| | | | | 706/11 |
| 2022/0217781 A1* | 7/2022 | Decarreau | ............... | G06N 3/08 |
| 2022/0294666 A1* | 9/2022 | Jeon | ............... | H04B 17/3913 |
| 2023/0014613 A1* | 1/2023 | Je | ............... | H04W 36/0058 |
| 2023/0177349 A1* | 6/2023 | Balakrishnan | ............... | H04L 67/10 |
| | | | | 706/25 |
| 2023/0209384 A1* | 6/2023 | Pantelidou | ............... | H04W 24/10 |
| | | | | 370/252 |
| 2023/0247503 A1* | 8/2023 | Chen | ............... | H04W 48/16 |
| | | | | 370/331 |
| 2023/0262448 A1* | 8/2023 | Ryd?n | ............... | G06N 3/045 |
| | | | | 455/418 |
| 2023/0276263 A1* | 8/2023 | Rydén | ............... | H04W 24/02 |
| | | | | 455/414.1 |
| 2023/0292168 A1* | 9/2023 | Tomala | ............... | G06N 20/00 |
| 2023/0345271 A1* | 10/2023 | Veijalainen | ............... | H04W 24/10 |
| 2023/0354462 A1* | 11/2023 | Jo | ............... | H04W 76/27 |

\* cited by examiner

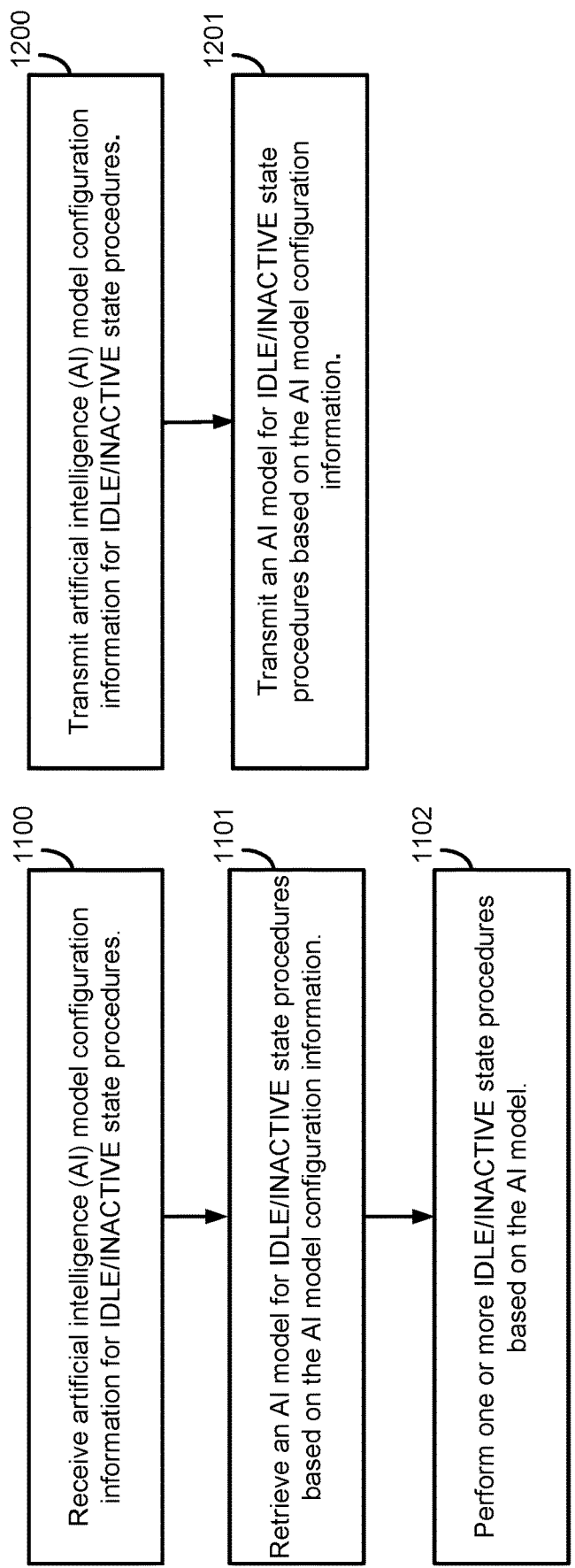

ARTIFICIAL INTELLIGENCE BASED ENHANCEMENTS FOR IDLE AND INACTIVE STATE OPERATIONS

TECHNICAL FIELD

Aspects of the present disclosure relate generally to wireless communication systems, and more particularly, configuring and implementing artificial intelligence based improvements for performing enhanced RRC IDLE and INACTIVE state operations. Some features may enable and provide improved communications, including performing enhanced RRC IDLE and INACTIVE state operations using artificial intelligence.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes receiving, by a wireless communication device, artificial intelligence (AI) model configuration information for IDLE/INACTIVE state procedures; retrieving, by the wireless communication device, an AI model for IDLE/INACTIVE state procedures based on the AI model configuration information; and performing, by the wireless communication device, one or more IDLE/INACTIVE state procedures based on the AI model.

In an additional aspect of the disclosure, an apparatus configured for wireless communication is disclosed. The apparatus includes at least one processor, and a memory coupled to the at least one processor. The at least one processor is configured to receive artificial intelligence (AI) model configuration information for IDLE/INACTIVE state procedures; retrieve an AI model for IDLE/INACTIVE state procedures based on the AI model configuration information; and perform one or more IDLE/INACTIVE state procedures based on the AI model.

In an additional aspect of the disclosure, an apparatus configured for wireless communication is disclosed. The apparatus includes means for receiving, by a wireless communication device, artificial intelligence (AI) model configuration information for IDLE/INACTIVE state procedures; means for retrieving, by the wireless communication device, an AI model for IDLE/INACTIVE state procedures based on the AI model configuration information; and means for performing, by the wireless communication device, one or more IDLE/INACTIVE state procedures based on the AI model.

In an additional aspect of the disclosure, a non-transitory computer-readable medium stores instructions that, when executed by a processor, cause the processor to perform operations including receiving, by a wireless communication device, artificial intelligence (AI) model configuration information for IDLE/INACTIVE state procedures; retrieving, by the wireless communication device, an AI model for IDLE/INACTIVE state procedures based on the AI model configuration information; and performing, by the wireless communication device, one or more IDLE/INACTIVE state procedures based on the AI model.

In an additional aspect of the disclosure, a method of wireless communication includes transmitting, by a wireless communication device, artificial intelligence (AI) model configuration information for IDLE/INACTIVE state procedures; and transmitting, by the wireless communication device, an AI model for IDLE/INACTIVE state procedures based on the AI model configuration information.

In an additional aspect of the disclosure, an apparatus configured for wireless communication is disclosed. The apparatus includes at least one processor, and a memory coupled to the at least one processor. The at least one processor is configured to transmit artificial intelligence (AI) model configuration information for IDLE/INACTIVE state procedures; and transmit an AI model for IDLE/INACTIVE state procedures based on the AI model configuration information.

In an additional aspect of the disclosure, an apparatus configured for wireless communication is disclosed. The apparatus includes means for transmitting, by a wireless communication device, artificial intelligence (AI) model configuration information for IDLE/INACTIVE state procedures; and means for transmitting, by the wireless communication device, an AI model for IDLE/INACTIVE state procedures based on the AI model configuration information.

In an additional aspect of the disclosure, a non-transitory computer-readable medium stores instructions that, when executed by a processor, cause the processor to perform operations including transmitting, by a wireless communication device, artificial intelligence (AI) model configuration information for IDLE/INACTIVE state procedures; and transmitting, by the wireless communication device, an AI model for IDLE/INACTIVE state procedures based on the AI model configuration information.

In an additional aspect of the disclosure, a method of wireless communication includes receiving, by a wireless communication device, artificial intelligence (AI) model configuration information for IDLE/INACTIVE state procedures; retrieving, by the wireless communication device, AI models for IDLE/INACTIVE state procedures based on the AI model configuration information; and selecting, by the wireless communication device, an AI model for IDLE/INACTIVE state procedures based on priorities of configured models and UE mobility, area, power, and other status.

In an additional aspect of the disclosure, a method of wireless communication includes receiving, by a wireless communication device, an indication for usage of artificial intelligence (AI) based IDLE/INACTIVE state procedures; determining, by the wireless communication device, an AI model for IDLE/INACTIVE state procedures based on wireless communication device capability; retrieving, by the wireless communication device, the determined AI model from memory; and setting, by the wireless communication device, the retrieved AI model for IDLE/INACTIVE state procedures.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 11 is a flow diagram illustrating an example process that supports AI model-based enhancements for RRC IDLE and INACTIVE state operations according to one or more aspects.

FIG. 12 is a flow diagram illustrating an example process that supports AI model-based enhancements for RRC IDLE and INACTIVE state operations according to one or more aspects.

Like reference numbers and designations in the various drawings indicate like elements.

DETAILED DESCRIPTION

Figure 1:
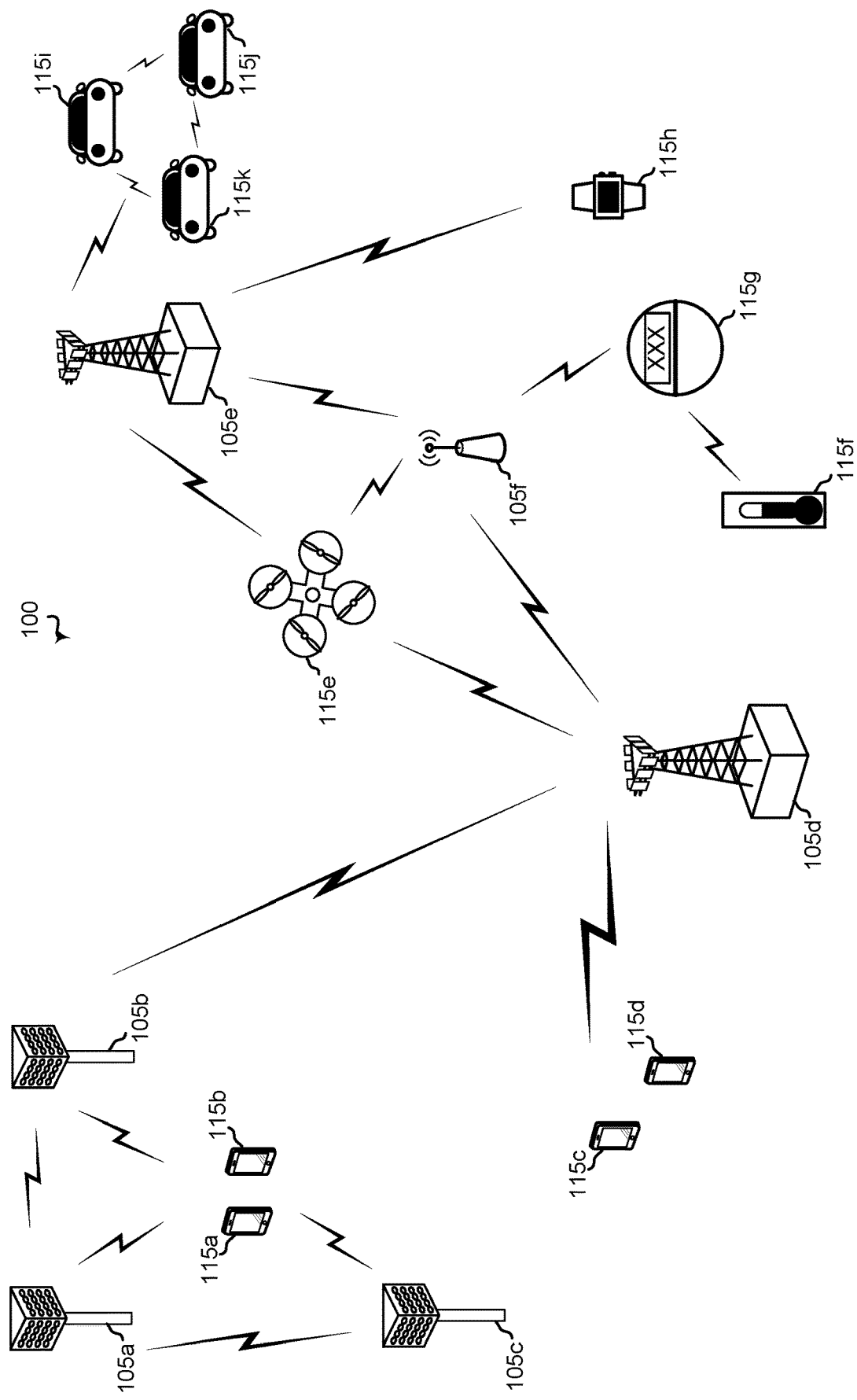
FIG. 1 is a block diagram illustrating example details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS, LTE, and NR are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements, etc. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, aggregated or dis-aggregated deployments, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
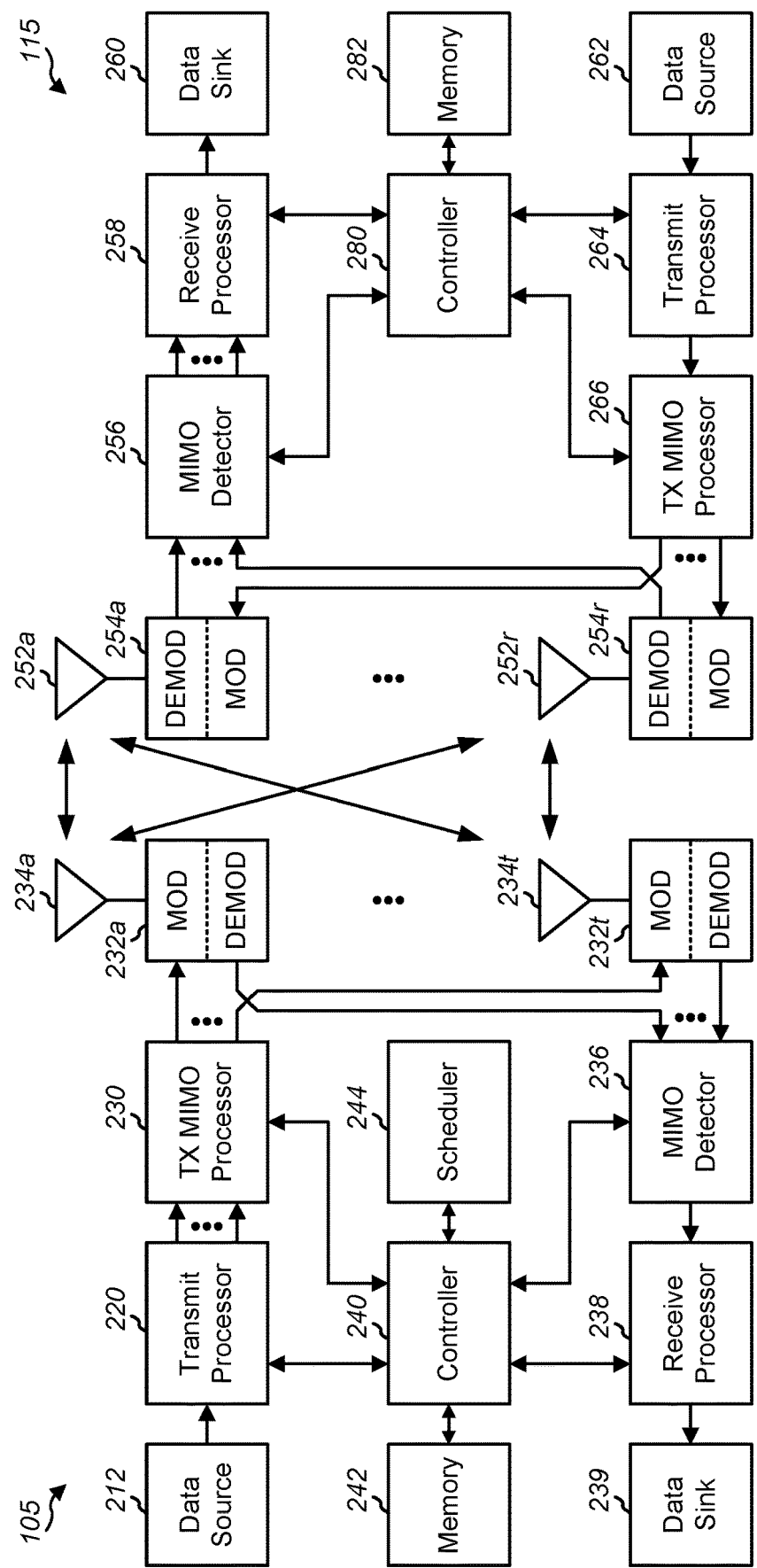
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 11 and 12, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3A:
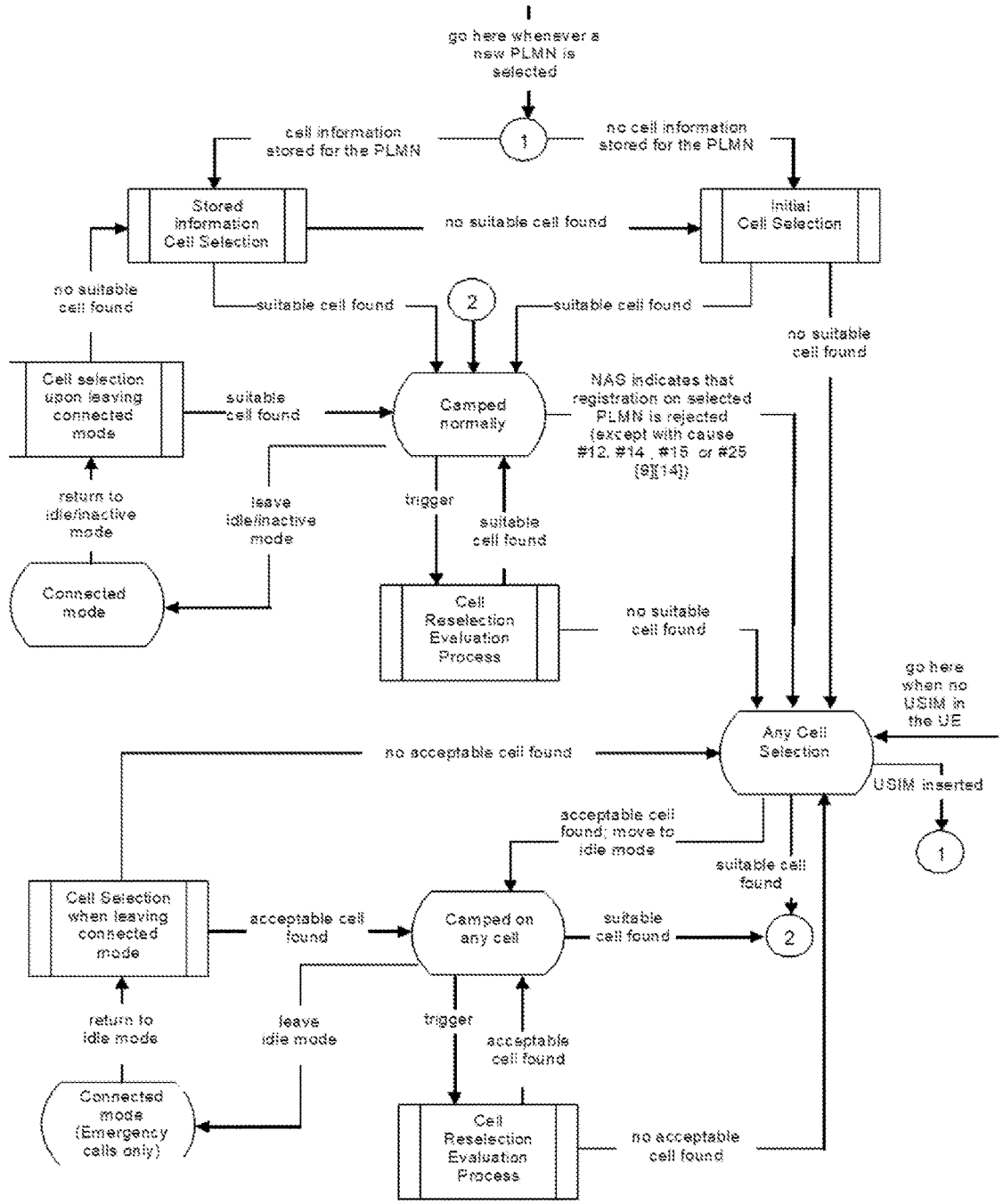
FIG. 3A is a block flow diagram illustrating an example of radio resource control (RRC) IDLE and INACTIVE state cell selection and reselection procedures.

FIG. 3A illustrates an example diagram of legacy, non-artificial intelligence (AI) based, RRC IDLE and RRC INACTIVE state operations. Specifically, FIG. 3A illustrates RRC IDLE and INACTIVE state cell selection and reselection operations. As shown in FIG. 3A, a device may perform certain evaluations and transmit certain messages when performing cell selection and reselection operations.

Cell selection and reselection procedures allow a UE to select a more suitable cell and camp on it. For the evaluation of non-serving cells for selection (e.g., selection or reselection), the UE may use parameters provided by the serving cell. For a second or final check on cell selection criterion, the UE may use parameters provided by the target cell for cell selection (or reselection). The UE selects a suitable cell based on RRC IDLE or RRC INACTIVE state measurements and cell selection (or reselection) criteria.

The UE evaluates the cell selection (or reselection) prioritization for NR frequencies and inter-RAT frequencies. The UE may evaluate the frequencies based on absolute priorities of different NR frequencies or inter-RAT frequencies provided to the UE in the system information (SIB message) or in the RRCRelease message.

In some implementations, the UE may inherit the priorities or frequencies from another RAT at inter-RAT cell (re)selection. The network further may configure scaling of cell reselection timing and cell ranking based on UE speed categorization: rate of change of cell, NR Inter-frequency and inter-RAT Cell Reselection criteria, Intra-frequency and equal priority inter-frequency Cell Reselection criteria, or a combination thereof.

As an illustrative, non-exclusive list of use cases of IDLE and/or INACTIVE state operations for AI model use includes public land mobile network (PLMN) selection, stand-alone non-public network (SNPN) selection, cell selection procedures, cell reselection procedures, reducing Resynchronization signal (RSS) detection, reducing Secondary synchronization signal (SSS) detection, reducing synchronization time, relaxing beam measurements, frequency for cell selection, paging cycle optimization, Random Access Channel (RACH) optimization, beam selection, Preamble resources selection, Physical Random Access Channel (PRACH) resources selection, early measurement optimizations, SIB caching algorithm, unified access control back-off timer selection, random number generation, on-demand SI request and response, optimized RA resource allocation for a specific SI or a combination thereof.

Regarding PLMN an SNPN selection, AI models may be used to intelligently optimize the PLMN and SNPN selection at the UE, such as by adjusting evaluation criteria. Regarding cell selection and reselection procedures, AI models may be used to adjust operations or evaluation criteria, including selection of the same gNB to alleviate registration or tracking area updates. Regarding Paging cycle optimization, AI models may be used to optimize the UE paging cycle to dynamically reduce or increase the paging cycle in RRC INACTIVE or IDLE states. Regarding, SIB caching algorithm, AI models may be used to improve efficiency and alleviate unnecessary on-demand request and response.

Such operations may be improved by the use of AI. AI studies ways to build intelligent programs and machines that can creatively solve problems. Machine learning (ML) is a subset of AI that provides systems the ability to automatically learn and improve from experience without being explicitly programmed. With ML, a device can use an algorithm that learns from and make predictions on data. In ML, there are different algorithms (e.g. neural networks) that help to solve problems. Deep or neural learning are subsets of machine learning, which use neural networks to analyze different factors with a structure that is similar to the human neural system.

AI as used herein includes or contemplates the use of any specific subset or category of AI, such as ML or deep learning. In some implementations, RRC state operations may be improved using AI and mobility information. Mobility information commonly includes categories of device speed (e.g., in a car, walking etc.) In the aspects described herein, this mobility information can be enhanced to provide speed (e.g., MPH), direction, and other mobility sensor information. One example of enhanced mobility information described herein is mobility pattern information. Mobility pattern information is historical device mobility and movement information which may indicate or provide insight into future device movement, and is illustrated as a simplified example in FIG. 3B. This mobility pattern information can be analyzed and/or applied using AI to better predict where a device is going, which can lead to improved RRC operations, such as RRC IDLE and INACTIVE operations. Examples of such improvements include cell selection and reselection, if a UE can predict where it is more likely to go, it can improve cell selection and reselection RRC IDLE and INACTIVE operations.

Figure 3B:
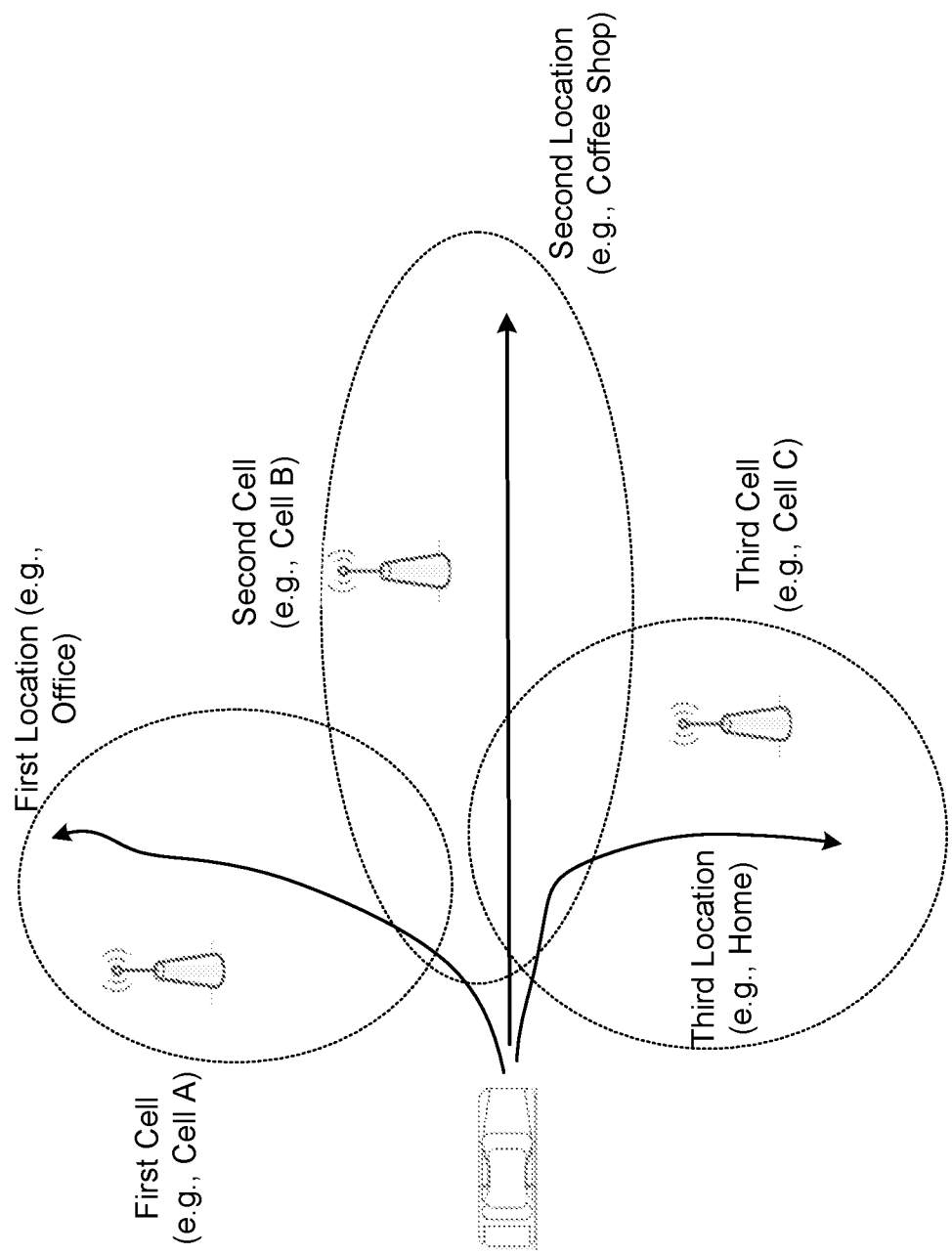
FIG. 3B is a diagram illustrating an example of mobility patterns of a UE which can be used to enhance IDLE or INACTIVE state procedures.

Referring to FIG. 3B, FIG. 3B illustrates a network cell diagram and mobility pattern information for a device. The mobility pattern information may be useful in enhancing cell selection and reselection procedures, selecting target measurement object and measurement periodicity in IDLE or INACTIVE (IDLE/INACTIVE) states, and other IDLE or INACTIVE state procedures. The device may include or correspond to the vehicle (e.g., the car) or a device within the car (e.g., smartphone or smartwatch). The device, i.e., the UE, may have historical data which indicates common mobility patterns of the device. This historical data may include parameters (e.g., speed, direction, timing, etc.), routes, destinations, or a combination thereof. The UE may use this historical mobility/movement data, mobility pattern information, to generate mobility patterns of the device. The UE may then use the mobility pattern information and mobility patterns to enhance or optimize RRC IDLE and INACTIVE state operations.

The UE may use AI to generate the mobility pattern information or mobility patterns from historical movement data. Additionally, or alternatively, the UE may use AI in combination with the mobility pattern information to enhance or optimize RRC IDLE and INACTIVE state cell selection and reselection operations. As example of such will be explained with reference to FIG. 3B. Although the example is related to mobility pattern information for cell selection and reselection operations, in other aspects other parameters may be used and/or such may be applied to other operations.

In the example of FIG. 3B, the network 301 includes three cells, Cell A, Cell B, and Cell C. Cell A is associated with and services a first area which includes a first location (e.g., Office). Cell B is associated with and services a second area which includes a second location (e.g., Coffee Shop). Cell C is associated with and services a third area which includes a third location (e.g., Home). The first, second and third areas partially overlap with each other. That is, the second area overlaps both the first area and the third area.

At a first time, the UE may determine to select the second cell, Cell B, based on the mobility pattern information indicating that previously at or around the first time the UE often visits the second location, Coffee Shop, before visiting the first location, Office. Additionally, or alternatively, one or more other parameters (e.g., parameters other than time or destination order) could be used to determine or prioritize the second cell, Cell B, over the other cells for selection or reselection. Thus, when the UE is in or near the overlap area between the first and second cells, the UE may prioritize and select the second cell.

At a second time, the UE may determine to select the first cell, Cell A, based on the mobility pattern information indicating that previously at or around the second time the UE often visits the first location, Office, after visiting the second location, Coffee Shop. As described above, other parameters may be used. Thus, when the UE is in or near the overlap area between the first and second cells, the UE may prioritize and select the first cell.

At a third time, the UE may determine to select the third cell, Cell C, based on the mobility pattern information indicating that at previously around the third time the UE often visits the third location, Home, after visiting the first location, Office. As described above, other parameters may be used. Thus, when the UE is in or near the overlap area between the second and third cells, the UE may prioritize and select the third cell.

In some aspects the network (e.g., a base station of one or more of the Cells A-C) configures an AI model for the UE to use during RRC IDLE or inactive state procedures. The network may configure such by dedicated RRC signaling in connected state or in separate or conventional RRC signal (e.g., RRCReconfiguration or RRCRelease). Alternatively, the network may configure such by broadcast or on-demand system information messages.

Is some aspects, the network and/or UE may prioritize different AI models and switch between the AI models. For example, the UE may select the AI model independently. As another example, the network may configured which AI model or models can be used for what operations.

Additionally, or alternatively, the UE may further evaluate and train the model. In some such implementations, the UE may optionally report the evaluation information or training information to the network, such as by logged minimization of drive test (MDT) measurement reporting.

AI based cell selection and reselection may offer improvements over conventional methods by not only considering UE speed categorization (e.g., walking) but also actual speed, sensor information, and UE mobility pattern information. Current cell selection and reselection parameters are cell specific, and do not consider UE specific mobility. Cell selection and reselection can be improved by not only considering UE speed categorization, but also considering actual speed, sensor information, and UE mobility pattern information. Using such parameters (or additional parameters) may enable improved cell selection and reselection even when mobility state configuration is not broadcasted by the network.

Specifically, AI model-based cell selection can be more efficient in handling cell selection and/or reselection by considering both cell level and UE level information. Furthermore, an AI model-based cell selection can use other metrics to more appropriately select and/or reselect cells for obtaining better performance when the UE transitions to a connected state. For example, transition probability from IDLE/INACTIVE to CONNECTED state can be used for cell selection to obtain better performance in the CONNECTED state.

Figure 4:
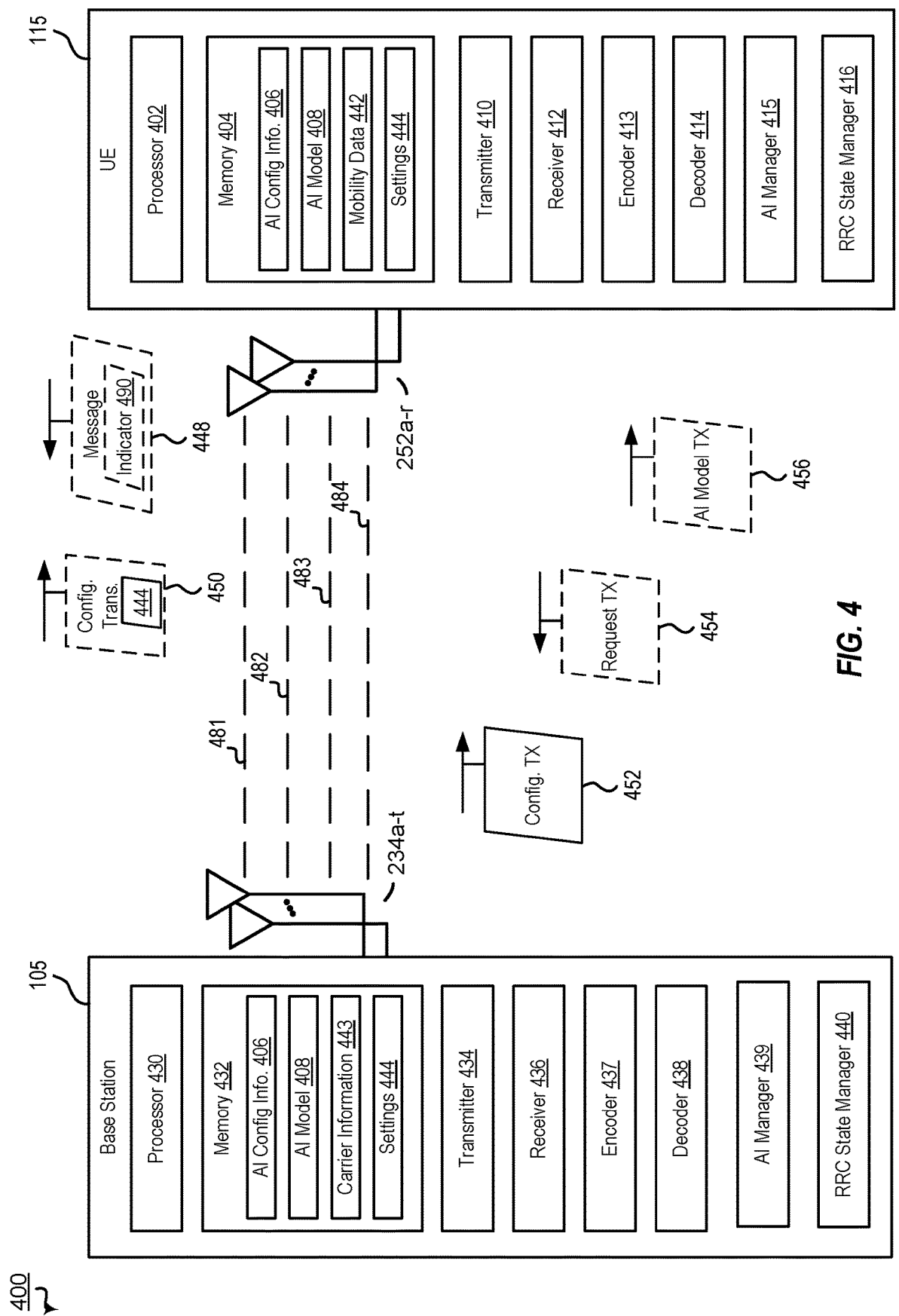
FIG. 4 is a block diagram illustrating an example wireless communication system that supports artificial intelligence (AI) model-based enhancements for RRC IDLE and INACTIVE state operations according to one or more aspects.

FIG. 4 illustrates an example of a wireless communications system 400 that supports enhanced RRC IDLE and INACTIVE state operations using AI in accordance with aspects of the present disclosure. In some examples, wireless communications system 400 may implement aspects of wireless communication system 100. For example, wireless communications system 400 may include multiple wireless communication devices and optionally a network entity. In the example of FIG. 4, the wireless communications system 400 includes a base station 105, and a UE 115. Use of AI model-based operations may improve RRC IDLE and INACTIVE state operations. Improved operations in such states may reduce latency and increase throughput by decreasing failed transmissions, such as through improve cell selection and reselection. Thus, network and device performance can be increased.

UE 115 and base station 105 may be configured to communicate via frequency bands, such as FR1 having a frequency of 410 to 7125 MHz, FR2 having a frequency of 24250 to 52600 MHz for mm-Wave, and/or one or more other frequency bands. It is noted that Sub-carrier spacing (SCS) may be equal to 15, 30, 60, or 120 kHz for some data channels. UE 115 and base station 105 may be configured to communicate via one or more component carriers (CCs), such as representative first CC 481, second CC 482, third CC 483, and fourth CC 484. Although four CCs are shown, this is for illustration only, more or fewer than four CCs may be used. One or more CCs may be used to communicate control channel transmissions, data channel transmissions, and/or sidelink channel transmissions.

Such transmissions may include a Physical Downlink Control Channel (PDCCH), a Physical Downlink Shared Channel (PDSCH), a Physical Uplink Control Channel (PUCCH), a Physical Uplink Shared Channel (PUSCH), a Physical Sidelink Control Channel (PSCCH), a Physical Sidelink Shared Channel (PSSCH), or a Physical Sidelink Feedback Channel (PSFCH). Such transmissions may be scheduled by aperiodic grants and/or periodic grants.

Each periodic grant may have a corresponding configuration, such as configuration parameters/settings. The periodic grant configuration may include configured grant (CG) configurations and settings. Additionally, or alternatively, one or more periodic grants (e.g., CGs thereof) may have or be assigned to a CC ID, such as intended CC ID.

Each CC may have a corresponding configuration, such as configuration parameters/settings. The configuration may include bandwidth, bandwidth part, HARQ process, TCI state, RS, control channel resources, data channel resources, or a combination thereof. Additionally, or alternatively, one or more CCs may have or be assigned to a Cell ID, a Bandwidth Part (BWP) ID, or both. The Cell ID may include a unique cell ID for the CC, a virtual Cell ID, or a particular Cell ID of a particular CC of the plurality of CCs. Additionally, or alternatively, one or more CCs may have or be assigned to a HARQ ID. Each CC may also have corresponding management functionalities, such as, beam management, BWP switching functionality, or both. In some implementations, two or more CCs are quasi co-located, such that the CCs have the same beam and/or same symbol.

In some implementations, control information may be communicated via UE 115 and base station 105. For example, the control information may be communicated using Medium Access Control (MAC) Control Element (MAC CE) transmissions, Radio Resource Control (RRC) transmissions, sidelink control information (SCI) transmissions, another transmission, or a combination thereof.

UE 115 can include a variety of components (e.g., structural, hardware components) used for carrying out one or more functions described herein. For example, these components can includes processor 402, memory 404, transmitter 410, receiver 412, encoder, 413, decoder 414, AI manager 415, RRC state manager 416, and antennas 252a-r. Processor 402 may be configured to execute instructions stored at memory 404 to perform the operations described herein. In some implementations, processor 402 includes or corresponds to controller/processor 280, and memory 404 includes or corresponds to memory 282. Memory 404 may also be configured to store AI model configuration information data 406, AI model data 408, mobility information data 442, settings data 444, or a combination thereof, as further described herein.

The AI model configuration information data 406 includes or corresponds to data associated with or corresponding to data for configuring and indicating AI models. The AI model configuration information data 406 may indicate or enable determination of AI models to be used for RRC IDLE and INACTIVE state operations. The AI model configuration information data 406 may include or correspond to RRC IDLE/INACTIVE model configuration information, validity area information of the model configuration, validity time information of the model configuration, model ID information, model list information, Neural Network Function identifier (NNF ID) information, parameter set information, event ID information, or a combination thereof.

The AI model data 408 includes or corresponds to data associated or corresponding to an AI model. The AI model data 408 may indicate a particular AI model or list of AI models by including AI model identification information, such as model ID or NNF ID. Additionally or alternatively, the AI model data 408 may indicate a particular AI model or list of AI models by including configuration and/or parameter set information. For example, the AI model data 408 may include a set of input and/or output parameters for the AI model and indicate or identify a particular AI model or list of AI models by the configurations or parameters. The AI model data 408 may optionally include an indication of what operations the AI model corresponds to, such as a one or more operations in RRC IDLE and/or RRC INACTIVE states.

The AI model, and the AI model information, may include standardized characteristics. For example, the AI model information may include model name information or model ID information, such as Standardized NNF ID (Neural Network Function ID). Additionally, the AI model, and the AI model information, may include one or more input parameters. As illustrative, non-limiting examples, the one or more input parameters may include an In-device Co-existence (IDC) condition, a thermal condition, a Network broadcasted SI for the cell-reselection, UE measured radio measurements (e.g., reference signal received power (RSRP), reference signal received quality (RSRQ), or both), device speed, device pattern, device trajectory, device orientation, Network/RAN slice information, unified access control (UAC) and service categories supported by a base station, QoS requirements for uplink traffic to select or reselect a best cell prior to transition to connected state, transition rate between RRC states, or a combination thereof, and wherein the one or more output parameters include a target cell list for cell-reselection, a target cell list for measurements, UE estimation of cell-reselection parameters, or a combination thereof.

Additionally or alternatively, the AI model, and the AI model information may include one or more output parameters. As illustrative, non-limiting examples, the one or more output parameters may include a target cell list for cell-reselection, a target cell list for measurements, UE estimation of cell-reselection parameters, or a combination thereof.

In some implementations, the AI model and AI model information may further include prioritization information. The prioritization information may indicate a particular model or models to use for certain situations and/or operations, such as which model or models to use for cell reselection. The network (e.g., base station) may provide the prioritization of different AI models for a particular operation (e.g., cell-reselection), if multiple models/model IDs/model descriptors are configured at the UE for cell-reselection in the particular operation (e.g., cell-reselection in the IDLE/INACTIVE state).

The mobility information data 442 includes or corresponds to data associated with historical movement data of the UE 115. The mobility information data 442 may include mobility pattern information, such as movement patterns, destination patterns, timing patterns, etc. of the UE 115. Additionally, or alternatively, the mobility information data 442 may include speed and mobility sensor information and corresponding time information.

The settings data 444 includes or corresponds to data associated with AI model based RRC IDLE and INACTIVE state operations. The settings data 444 may include settings and/or conditions data for determination, indication, or reporting procedures for AI model based RRC IDLE and INACTIVE state operations. The settings data 444 may include prioritization information (e.g., AI model prioritization information), AI model training information, RRC procedure data, RRC operation data, RRC state data, AI model list data, AI model parameter data, AI model reporting data, AI model selection and evaluation data, etc.

Transmitter 410 is configured to transmit data to one or more other devices, and receiver 412 is configured to receive data from one or more other devices. For example, transmitter 410 may transmit data, and receiver 412 may receive data, via a network, such as a wired network, a wireless network, or a combination thereof. For example, UE 115 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 410 and receiver 412 may be replaced with a transceiver. Additionally, or alternatively, transmitter 410, receiver, 412, or both may include or correspond to one or more components of UE 115 described with reference to FIG. 2.

Encoder 413 and decoder 414 may be configured to encode and decode data for transmission. AI manager 415 may be configured to determine and perform AI model based RRC IDLE and INACTIVE state operations, including model identification, model selection, model use, model evaluation, model training, model reporting, or a combination thereof. For example, AI manager 415 is configured to perform RRC IDLE and ACTIVE state operations using AI models. The RRC operations may include the list of RRC operations described above with reference to FIG. 3A. As an illustrative example of identification operations, the AI manager 415 may determine which AI model to use for which operation or operations. To illustrate, the AI manager 415 may determine a model ID based on received information or based on stored information. As an illustrative example of model evaluation and selection operations, the AI manager 415 may evaluate the AI model and RRC state operations, determine whether to switch the AI model based on the evaluations, and optionally select a new AI model based on determining to switch. As an illustrative example of training and reporting operations, the AI manager 415 may train the model based on evaluation and report the training and/or evaluation to the network.

RRC state manager 416 may be configured to perform RRC state operations. For example, RRC state manager 416 is configured to perform RRC IDLE and INACTIVE state operations. To illustrate, RRC state manager 416 may determine RRC operation procedures for AI model. As another illustration, the RRC state manager 416 may use the AI model to perform cell selection. As another example, the RRC state manager 416 may use the AI model to perform cell reselection.

Base station 105 includes processor 430, memory 432, transmitter 434, receiver 436, encoder 437, decoder 438, AI manager 439, RRC state manager 440, and antennas 234*a-t*. Processor 430 may be configured to execute instructions stores at memory 432 to perform the operations described herein. In some implementations, processor 430 includes or corresponds to controller/processor 240, and memory 432 includes or corresponds to memory 242. Memory 432 may be configured to store AI model configuration information data 406, AI model data 408, carrier information data 443, settings data 444, or a combination thereof, similar to the UE 115 and as further described herein.

The carrier information data 443 may include aggregated AI model performance information. For example, the carrier information data 443 may include AI model performance data for multiple wireless communication devices (e.g., UEs). The base station 105 may utilize the carrier information data 443 to select or update AI models for use by wireless communication devices.

Transmitter 434 is configured to transmit data to one or more other devices, and receiver 436 is configured to receive data from one or more other devices. For example, transmitter 434 may transmit data, and receiver 436 may receive data, via a network, such as a wired network, a wireless network, or a combination thereof. For example, base station 105 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 434 and receiver 436 may be replaced with a transceiver. Additionally, or alternatively, transmitter 434, receiver, 436, or both may include or correspond to one or more components of base station 105 described with reference to FIG. 2.

Encoder 437, and decoder 438 may include the same functionality as described with reference to encoder 413 and decoder 414, respectively. AI manager 439 may include similar functionality as described with reference to AI manager 415. RRC state manager 440 may include similar functionality as described with reference to RRC state manager 416.

During operation of wireless communications system 400, base station 105 may determine that UE 115 has AI model-based RRC operation capability. For example, base station 105 or UE 115 may transmit a message 448 that includes a AI model capability indicator 490. Indicator 490 may indicate AI model-based RRC operation capability or a particular type or mode of AI model-based RRC operations. In some implementations, a base station 105 sends control information to indicate to UE 115 that AI model-based RRC operations and/or a particular type of AI model-based RRC operations are to be used. For example, in some implementations, message 448 (or another message, such as configuration transmission 450) is transmitted by the base station 105. The configuration transmission 450 may include or indicate to use AI model-based RRC operations or to adjust or implement a setting of a particular type of AI model-based RRC operations. For example, the configuration transmission 450 may include settings data 444, as indicated in the example of FIG. 4, in addition to or in the alternative of the AI model configuration information data 406 and/or the AI model data 408.

During operation, devices of wireless communications system 400, perform AI model-based RRC operations. For example, the base station 105 and the UE 115 perform AI model configuration for RRC IDLE and INACTIVE state operations. As another example, the base station 105 and the UE 115 perform AI model-based operations for RRC IDLE and INACTIVE states.

In the example of FIG. 4, the base station 105 generates and transmits a configuration transmission 452. The base station 105 generates the configuration transmission 452 which includes or indicates AI model configuration information 406. The AI model configuration information 406 may include model identification information, such as model ID or NNF ID. The model identification information alternatively may include parameter information which indicates a particular model. Additionally, the AI model configuration information 406 may further include other information regarding use of the model, such as describe The base station 105 may broadcast the transmission, or may transmit the transmission directly to the UE 115 or to a group which includes the UE 115.

The UE 115 receives the configuration transmission 452 from the base station 105 and determines the AI model configuration information 406. With the AI model configuration information 406, the network may configure the UE 115 with AI model ID and parameter sets, a list of model IDs and parameter sets, or NNF ID (based on NNF ID). If the model configuration concerns model training, the configuration can additionally include a MR address, a reporting interval and amount, a reporting Configuration, and periodic or event-based reporting.

The configuration transmission 452 may include or correspond to a higher layer transmission (e.g., RRC) or a SIB transmission, as described further with reference to FIGS. 5-8. When RRC signaling us used, the base station 105 may use separate RRC signaling (e. g., similar as Logged MDT style), and separate model configuration may be received for each IDLE/INACTIVE procedure. Alternatively, the base station 105 may use RRCReconfiguration signaling (RRC agnostic approach), and model configuration is received in a similar approach as for connected state training or inference.

Responsive to determining that the UE 115 does not have the AI model, such as the AI model data 408, the UE 115 may generate and transmit an AI model request transmission 454. The AI model request transmission 454 may include or correspond to a RRC transmission, a user-plane (U-plane) transmission, a control plane (C-plane) transmission, a RACH transmission, or an uplink transmission (e.g., PUSCH), such as described further with respect to FIGS. 5-8.

The network (e.g., the base station 105) may receive the AI model request transmission 454 and may generate and transmit an AI model transmission 456 which includes the AI model data 408 in response. The AI model transmission 456 may include or correspond to a RRC transmission, U-plane transmission, a C-plane transmission, a RACH transmission, an uplink transmission (e.g., PUSCH), or another transmission such as described further with respect to FIGS. 5-8.

The UE 115 (e.g., the AI manager 415) may receive the AI model transmission 456 and extract the AI model data 408. The UE 115 may set the AI model indicated by the AI model data 408 as an active model for one or more RRC IDLE and/or INACTIVE state procedures. The UE 115 can download cell-specific, area-specific (RNC, tracking area, or routing area specific) or UE-specific model that UE 115 may use in the IDLE/INACTIVE state for IDLE/INACTIVE state procedures. Examples of different operations for receiving the AI model are described further with reference to FIGS. 5-8.

After receiving the AI model (the AI model data 408), the UE 115 may set the AI model for use in one or more RRC IDLE and INACTIVE state operations. Upon being in the RRC IDLE or INACTIVE state (e.g., such as by transitioning to such a state), the UE 115 may perform one or more RRC IDLE or INACTIVE state operations using the AI model. Additionally, examples of use of the AI model are described further with reference to FIGS. 9 and 10.

Accordingly, the UE 115 and the base station 105 may be able to more effective receive AI model information and perform RRC IDLE and INACTIVE state operations. Thus, FIG. 4 describes enhanced AI model-based RRC IDLE and INACTIVE state configuration and operations for wireless communication devices. Performing enhanced AI model-based RRC IDLE and INACTIVE state configuration and operations enables improved RRC and IDLE state operations (e.g., improved cell selection and reselection) and thus, enhanced UE and network performance by increasing throughput and reducing errors and latency. As an illustrative example, better cells can be selected which reduce cell hopping and increase time between cell switching.

FIGS. 5-10 illustrate examples of ladder diagrams for AI model configuration and use for RRC IDLE and INACTIVE state operations according to some aspects. The examples of FIGS. 5-10 include similar devices to the devices described in FIGS. 1, 2, and 4, such as UE 115 and base station 105. The devices, such as UE 115 and base station 105, of FIGS. 5-10 may include one or more of the components as described in FIGS. 2 and 4. In such FIGs, these devices may utilize antennas 252*a-r*, transmitter 410, receiver 412, encoder 413 and/or decoder 414, or may utilize antennas 234*a-t*, transmitter 434, receiver 436, encoder 437 and/or decoder 438 to communicate transmissions and receptions.

Figure 5:
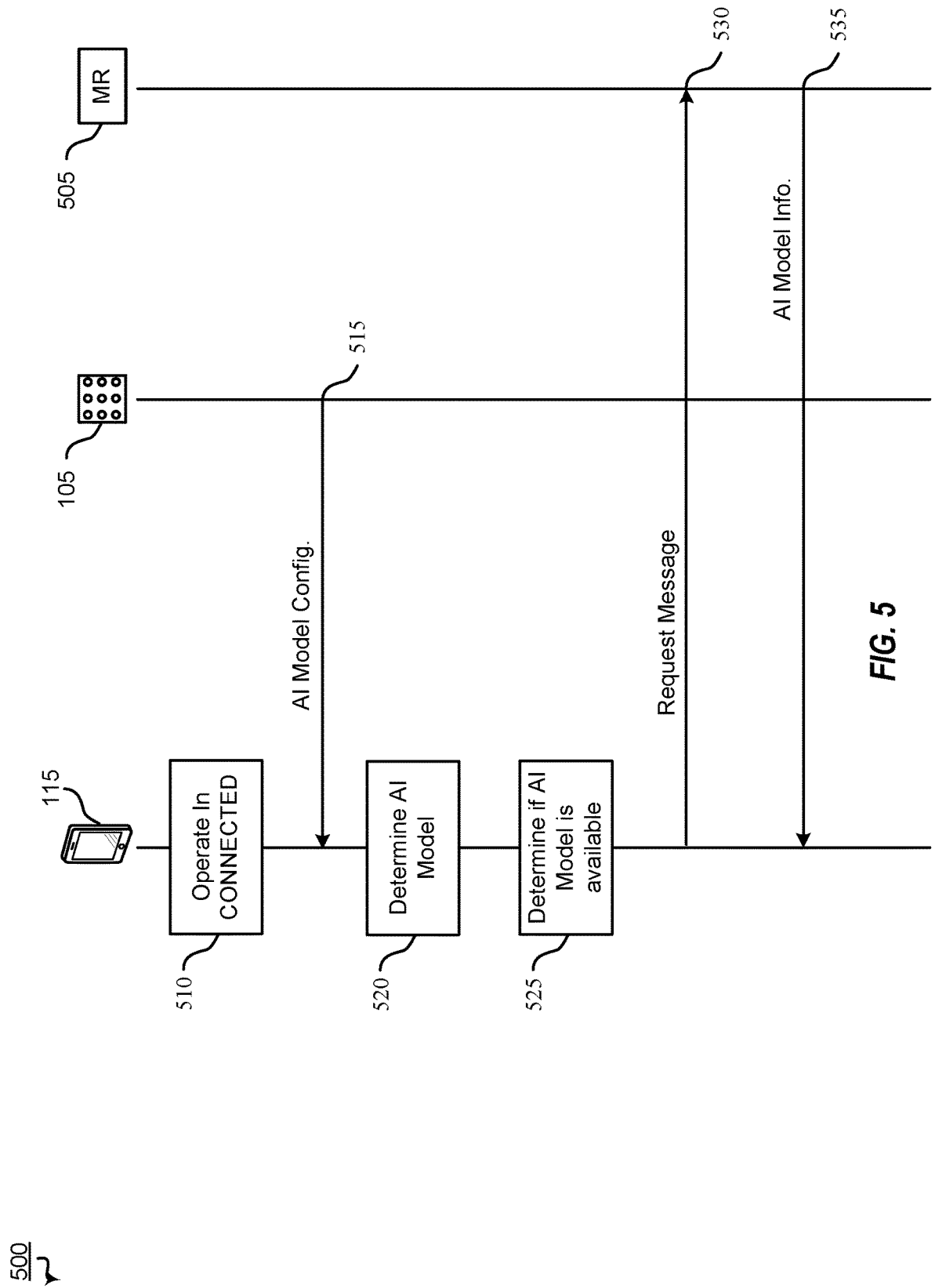
FIG. 5 is a ladder diagram illustrating an example wireless communication system that supports AI model-based enhancements for RRC IDLE and INACTIVE state operations according to one or more aspects.

Referring to FIG. 5, FIG. 5 is a ladder diagram 500 of UE CONNECTED state AI model configuration for RRC IDLE and INACTIVE state operations according to some aspects. In the example of FIG. 5, the ladder diagram illustrates a UE 115 and a network entity, such as base station 105 distinct or separate from (not collocated with) a model repository (MR). In other examples and aspects, the network entity, such the base station 105 is collocated with the MR 505.

The MR 505 may include or correspond to a wireless communication device or be included in another network device or entity. The MR 505 includes and stores AI model information for download and use by wireless communication devices.

At 510, the UE 115 operates in a RRC CONNECTED state. For example, the UE 115 is connected to the base station 105 (such as a gNB), and the base station 105 is a serving cell for the UE 115. The UE 115 may communicate with the base station 105 and transmit data to and/or receive data from the base station 105. Additionally, or alternatively, the base station 105 may coordinate sidelink operations for the UE 115.

At 515, the base station 105 transmits AI model configuration information to the UE 115. For example, the AI manager 439 of the base station 105 generates and transmits a AI model configuration message (e.g., configuration transmission 452) to the UE 115 which includes the AI model configuration information (e.g., 442) for one or more RRC IDLE or RRC INACTIVE state procedures. The AI model configuration information (e.g., 442) may include information for the AI model itself, for a corresponding report associated with the model, or both. The AI model configuration information may include settings, formats, transmission resources, etc. The AI model configuration message may include or correspond to a higher layer message, such as a layer 3 message. For example, the base station 105 generates a RRC message which indicates or includes the AI model configuration information. In some implementations, the AI model configuration message is sent to multiple UEs. In other implementations, the AI model configuration message is a PDCCH transmission, such as a DCI, or a MAC CE, or a sidelink transmission.

At 515, the UE 115 determines an AI model based on the AI model configuration information. For example, the AI manager 415 of the UE 115 determines an AI model or information thereof based on the received AI model configuration. To illustrate, the UE 115 may determine an AI model ID or NNF ID based on a field or an index included in or indicated by the AI model configuration information. In some implementations, the UE 115 may determine a list of models (e.g., list of AI model IDs or NNF IDs). When AI model IDs are used, the AI model configuration information may further include parameter sets, such as corresponding input and/or output parameters for the AI model. As described above, the AI model configuration information may also further include validity area information, validity time information, event ID information, or a combination thereof.

At 520, the UE 115 determines whether the determined AI model is available. For example, the AI manager 415 of the UE 115 determines if the determined AI model (e.g., AI model information, such as input and output parameters) is available at the UE. If the AI model is available, the UE 115 may set the determined AI model for future RRC IDLE/INACTIVE state procedures and continue operating in the RRC connected state with the base station 105. Alternatively, as shown in the example of FIG. 5, the UE 115 determines that the AI model is not available at the UE 115 and that the UE 115 is to obtain the AI model from the network (e.g., MR 505) or from another wireless communication device (e.g., a second UE).

At 530, the UE 115 transmits a model request message to the MR 505. For example, the AI manager 415 of the UE 115 generates and transmits an AI model request message to the base station 105 to download/retrieve the determine AI model which was indicated by the base station 105, and the base station 105 may relay the AI model request message to the MR 505. Alternatively, the UE 115 generates and transmits the AI model request message directly to the MR 505. The AI model request message may comprise a higher layer message, such as a layer 2 or 3 message and include or correspond to a C-plane communication Alternatively, such as when the MR 505 is collocated with the base station 105, the AI model request message may include or correspond to a U-plane communication. In other examples and aspects, other messages may be used.

At 535, the MR 505 (or the base station 105) transmits an AI model message to the UE 115. For example, an AI model manager of the MR 505 generates and transmits a AI model transmission to the UE 115 which indicates the AI model information for the determined AI model. Alternatively, the MR 505 may transmit the AI model transmission to the base station 105 which relays the AI model transmission to the UE 115. As described with reference to the AI model request message, the AI model message may comprise a higher layer message and include or correspond to U-plane or C-plane communications.

The UE 115 receives the AI model message and the AI model information. Optionally, the UE 115 sets the AI model as an active model for one or more RRC IDLE and/or INACTIVE state processes. As an illustrative, non-limiting example the UE 115 sets the AI model as an active AI model for future RRC IDLE state cell reselection operations. In other implementations and aspects, the UE 115 may set the AI model for any other RRC IDLE or INACTIVE state processes described herein in addition to or in the alternative to the RRC IDLE state cell reselection operations.

In addition, the UE 115 may optionally switch from the CONNECTED state to the IDLE or INACTIVE states at some time after receiving the AI model message and AI model information. Once in the IDLE or INACTIVE state, the UE 115 may use the AI model information to performed one or more operations. As an illustrative, non-limiting example the UE 115 sets the AI model as an active AI model for future RRC INACTIVE state cell reselection operations. In other implementations and aspects, the UE 115 may set the AI model for any other RRC IDLE or INACTIVE state processes described herein in addition to or in the alternative to the RRC INACTIVE state cell reselection operations.

As the UE 115 uses the AI model for one or more IDLE or INACTIVE state operations, the UE 115 may experience better performance in the one or more operations as compared to non-AI or legacy operations. That is, the use of AI models may improve UE 115 operations and enable the UE 115 to adjust/modify such operations for enhanced performance. As one example, the UE 115 may utilize mobility information, such as mobility pattern information, to improve cell selection and reselection operations when in the IDLE state, the INACTIVE state, or both.

In some implementations, the UE 115 may evaluate and further train (e.g., adjust) the AI model. In some such implementations, the UE 115 may switch models or revert to legacy operations based on further evaluation of performance of the AI model and process. In a particular implementation, the UE 115 may communicate such AI model evaluations or training/adjustment information to the network (e.g., base station 105).

In evaluating the AI model, the UE 115 may evaluate and log measurement data. The UE 115 may report this data in a repot message to the network, such as a loggedmeasurementreport message to the base station 105.

Thus, in the example in FIG. 5, the UE receives the AI model, for enhanced AI model-based RRC IDLE and INACTIVE state operations, while in the RRC CONNECTED state. That is, the UE 115 receives the AI model configuration while in the RRC CONNECTED state.

Figure 6:
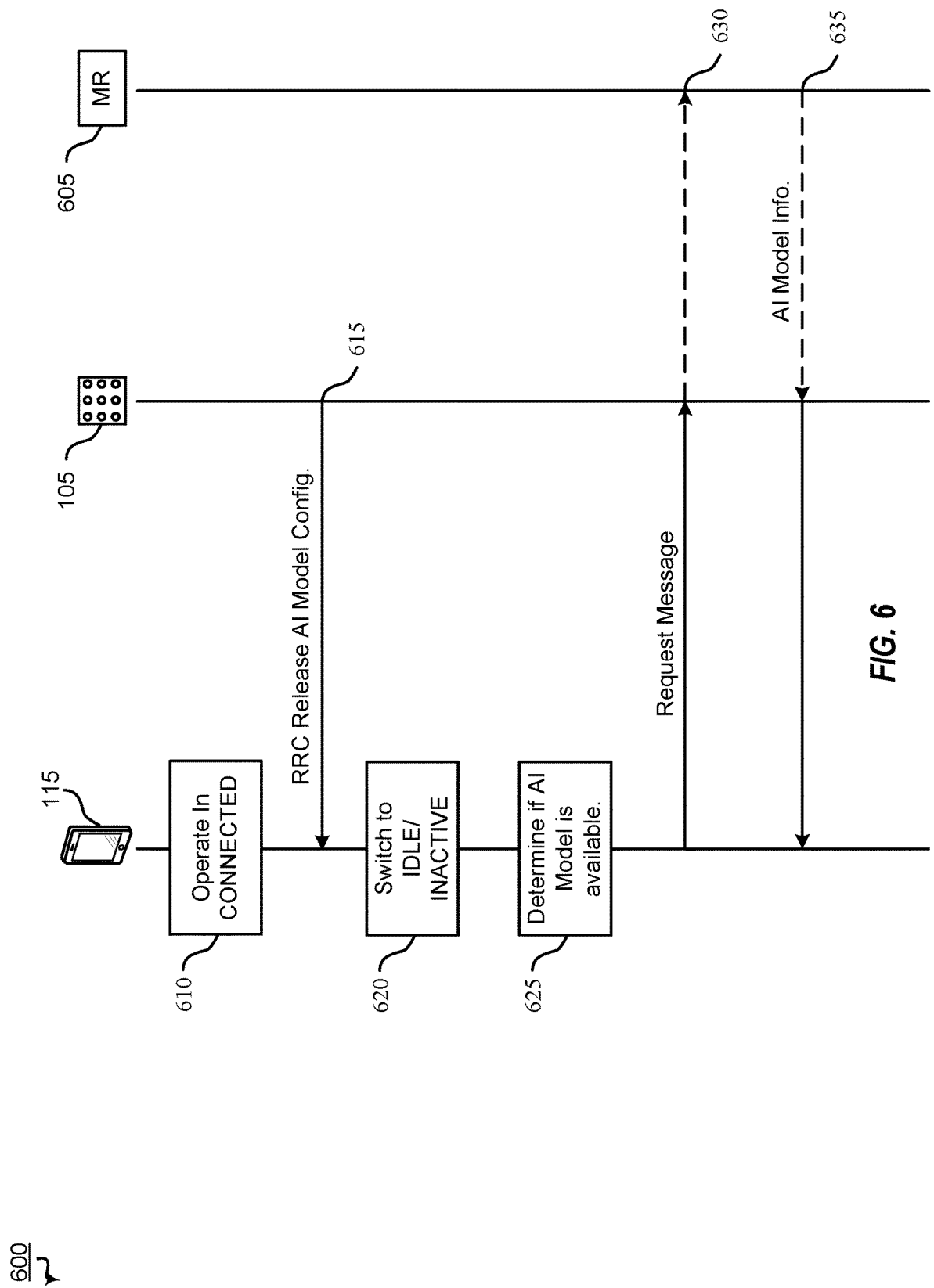
FIG. 6 is a ladder diagram illustrating another example wireless communication system that supports AI model-based enhancements for RRC IDLE and INACTIVE state operations according to one or more aspects.

Referring to FIG. 6, FIG. 6 is a ladder diagram 600 of RRC release based configuration for RRC IDLE and INACTIVE state operations according to some aspects. In the example of FIG. 6, the ladder diagram illustrates a UE 115 and a network entity, such as base station 105 distinct or separate from (not collocated with) a model repository (MR) 605. In other examples and aspects, the network entity, such the base station 105 is collocated with the MR 605. The MR 605 may include or correspond to the MR 505.

At 610, the UE 115 operates in a RRC CONNECTED state. For example, the UE 115 is connected to the base station 105 (such as a gNB), and the base station 105 is a serving cell for the UE 115. The UE 115 may communicate with the base station 105 and transmit data to and/or receive data from the base station 105. Additionally, or alternatively, the base station 105 may coordinate sidelink operations for the UE 115.

At 615, the base station 105 transmits AI model configuration information in a RRC release message to the UE 115. For example, the AI manager 439 of the base station 105 generates and transmits a RRC release message (e.g., AI model configuration message or configuration transmission 452) to the UE 115 which includes the AI model configuration information (e.g., 442) for one or more RRC IDLE or RRC INACTIVE state procedures. The AI model configuration information (e.g., 442) may include information for the AI model itself, for a corresponding report associated with the model, or both. The AI model configuration information may include settings, formats, transmission resources, etc.

At 620, the UE 115 switches to an RRC IDLE or INACTIVE state. For example, responsive to and/or based on the RRC release message, the UE 115 may release from (or camp on) the base station 105 and transition into an RRC IDLE state or an RRC INACTIVE state from the RRC CONNECTED state.

The UE 115 may optionally determine an AI model based on the AI model configuration information, as described with reference to 515 of FIG. 5. The UE 115 may determine the AI model before or after switching to the RRC IDLE or INACTIVE state.

At 625, the UE 115 determines whether the determined AI model is available. For example, the AI manager 415 of the UE 115 determines if the determined AI model (e.g., AI model information, such as input and output parameters) is available at the UE. If the AI model is available, the UE 115 may set the determined AI model for future RRC IDLE/INACTIVE state procedures and continue operating in the RRC IDLE or INACTIVE state. Alternatively, as shown in the example of FIG. 6, the UE 115 determines that the AI model is not available at the UE 115 and that the UE 115 is to obtain the AI model from the network (e.g., MR 605) or from another wireless communication device (e.g., a second UE).

At 630, the UE 115 transmits a model request message to the MR 605. For example, the AI manager 415 of the UE 115 generates and transmits an AI model request message to the base station 105 to download/retrieve the determine AI model which was indicated by the base station 105, and the base station 105 relays the AI model request message to the MR 605. The AI model request message may comprise a higher layer message, such as a layer 2 or 3 message, include or correspond to a RACH communication, or both. For example, the AI model request message may include or correspond to a PRACH preamble message (e.g., Msg 1), a RRC Connection Request (e.g., Msg 3), or a PRACH and data transmission (Msg A). In other examples and aspects, other messages may be used.

At 635, the base station 105 transmits an AI model message to the UE 115. For example, an AI model manager of the MR 605 generates and transmits the AI model transmission, which indicates the AI model information for the determined AI model, to base station 105 which relays the AI model transmission to the UE 115. To illustrate, the UE 115 may acquire the AI model through techniques similar to the AI model request, such as multicast and broadcast services (MBS), sidelink communications, broadcast control channel (BCCH) messages, system information block (SIB) messages, or non-access stratum (NAS) small data transfers. Alternatively, the UE 115 may receive the AI model from another UE via D2D communications.

The UE 115 receives the AI model message and the AI model information. Optionally, the UE 115 sets the AI model as an active model for one or more RRC IDLE and/or INACTIVE state processes. The UE 115 may optionally perform one or more operations as described with reference to FIG. 5 after setting the AI model as active.

Thus, in the example in FIG. 6, the UE receives the AI model, for enhanced AI model-based RRC IDLE and INACTIVE state operations, upon leaving the RRC CONNECTED state. That is, the UE 115 receives the AI model configuration in a RRC Release message while transitioning away from the RRC CONNECTED state. As compared to the example of FIG. 5, in the example of FIG. 6, the UE 115 is configured with the AI model information at or around a transition of the UE 115 from the RRC connected state to the RRC IDLE or INACTIVE state.

Figure 7:
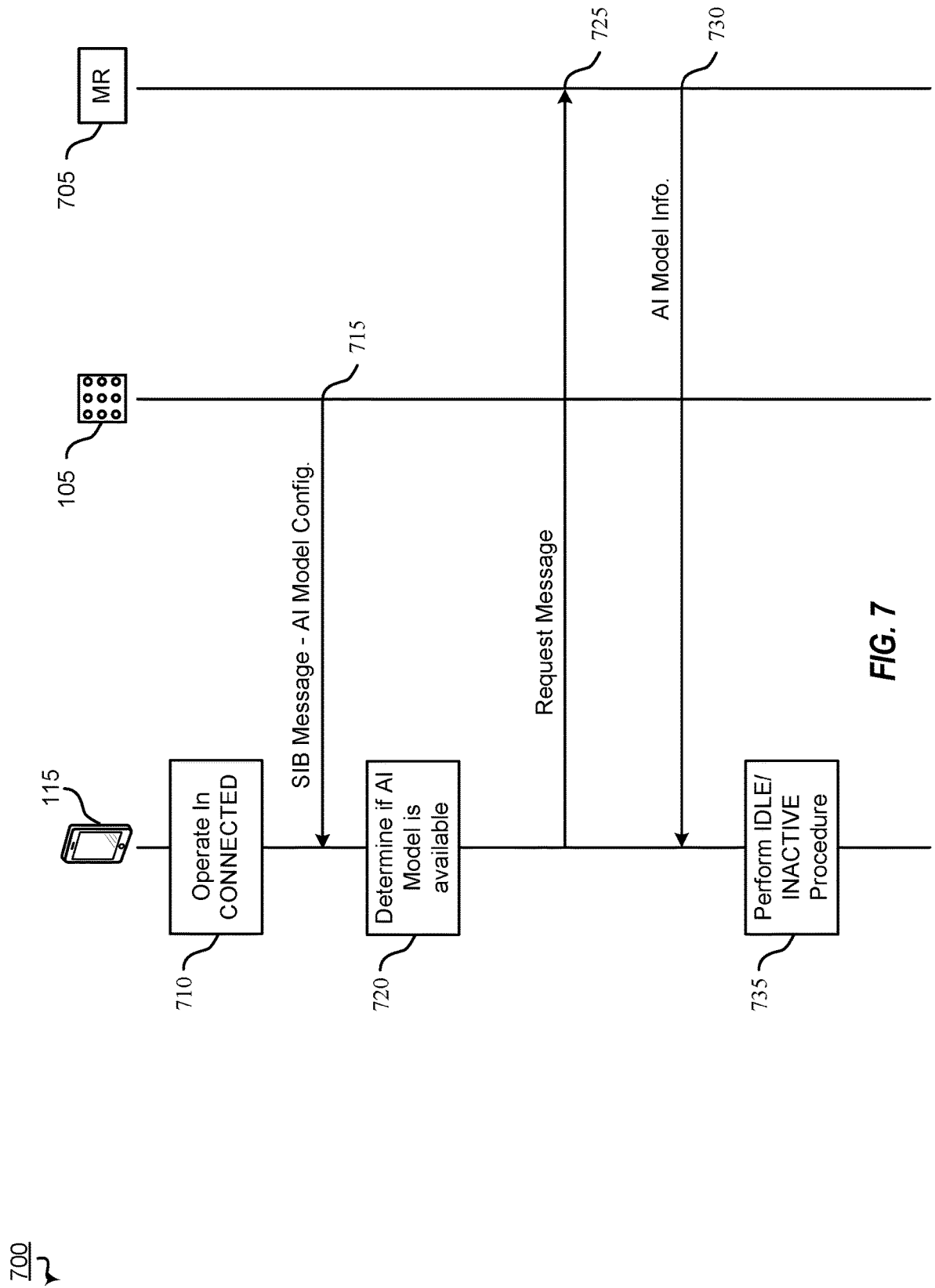
FIG. 7 is a ladder diagram illustrating another example wireless communication system that supports AI model-based enhancements for RRC IDLE and INACTIVE state operations according to one or more aspects.

Referring to FIG. 7, FIG. 7 is a ladder diagram 700 of RRC CONNECTED, SIB based configuration for RRC IDLE and INACTIVE state operations according to some aspects. In the example of FIG. 7, the ladder diagram illustrates a UE 115 and a network entity, such as base station 105 distinct or separate from (not collocated with) a model repository (MR) 705. In other examples and aspects, the network entity, such the base station 105 is collocated with the MR 705. The MR 705 may include or correspond to the MR 505 or 605.

At 710, the UE 115 operates in a RRC CONNECTED state. For example, the UE 115 is connected to the base station 105 (such as a gNB), and the base station 105 is a serving cell for the UE 115. The UE 115 may communicate with the base station 105 and transmit data to and/or receive data from the base station 105. Additionally, or alternatively, the base station 105 may coordinate sidelink operations for the UE 115.

At 715, the base station 105 transmits AI model configuration information in a SIB message to the UE 115. For example, the AI manager 439 of the base station 105 generates and transmits (e.g., broadcasts) a SIB message (e.g., AI model configuration message or configuration transmission 452) to the UE 115 which includes the AI model configuration information (e.g., 442) for one or more RRC IDLE or RRC INACTIVE state procedures. The AI model configuration information (e.g., 442) may include information for the AI model itself, for a corresponding report associated with the model, or both. The AI model configuration information may include settings, formats, transmission resources, etc.

The UE 115 may optionally determine an AI model based on the AI model configuration information, as described with reference to 515 of FIG. 5. At 720, the UE 115 determines whether the determined AI model is available. For example, the AI manager 415 of the UE 115 determines if the determined AI model (e.g., AI model information, such as input and output parameters) is available at the UE. If the AI model is available, the UE 115 may set the determined AI model for future RRC IDLE/INACTIVE state procedures and continue operating in the RRC IDLE or INACTIVE state. Alternatively, as shown in the example of FIG. 7, the UE 115 determines that the AI model is not available at the UE 115 and that the UE 115 is to obtain the AI model from the network (e.g., MR 705) or from another wireless communication device (e.g., a second UE).

At 725, the UE 115 transmits a model request message to the MR 705. For example, the AI manager 415 of the UE 115 generates and transmits an AI model request message to the base station 105 to download/retrieve the determine AI model which was indicated by the base station 105, and the base station 105 relays the AI model request message to the MR 705. Alternatively, the UE 115 transmits the AI model request message directly to the MR 705. The AI model request message may comprise a higher layer message, such as a layer 2 or 3 message, include or correspond to a RACH communication, or both. For example, the AI model request message may include or correspond to a PRACH preamble message (e.g., Msg 1), a RRC Connection Request (e.g., Msg 3), or a PRACH and data transmission (Msg A). In other examples and aspects, other messages may be used.

At 730, the base station 105 transmits an AI model message to the UE 115. For example, an AI model manager of the MR 605 generates and transmits a AI model transmission to the UE 115 which indicates the AI model information for the determined AI model. To illustrate, the UE 115 may acquire the AI model through techniques similar to the model request, such as MBS, sidelink, BCCH/SIB, NAS small data transfer. Alternatively, the UE 115 may receive the AI model from another UE via D2D communications.

At 735, the UE 115 may performs one or more operations for RRC. For example, the UE 115 sets the received AI model as an active model for one or more RRC IDLE and/or INACTIVE state processes and switches to an RRC IDLE or INACTIVE state at some time after receiving the AI model information, as described with reference to FIG. 5. The UE 115 may then perform one or more operations based on the AI model while in the RRC IDLE or INACTIVE state as described with reference to FIG. 5. Ins some implementations, the UE 115 may further evaluate and/or train the AI model, as described with reference to FIG. 5.

Thus, in the example in FIG. 7, the UE receives the AI model, for enhanced AI model-based RRC IDLE and INACTIVE state operations, while in the RRC CONNECTED state. That is, the UE 115 receives the AI model configuration in a SI message while in the RRC CONNECTED state.

Figure 8:
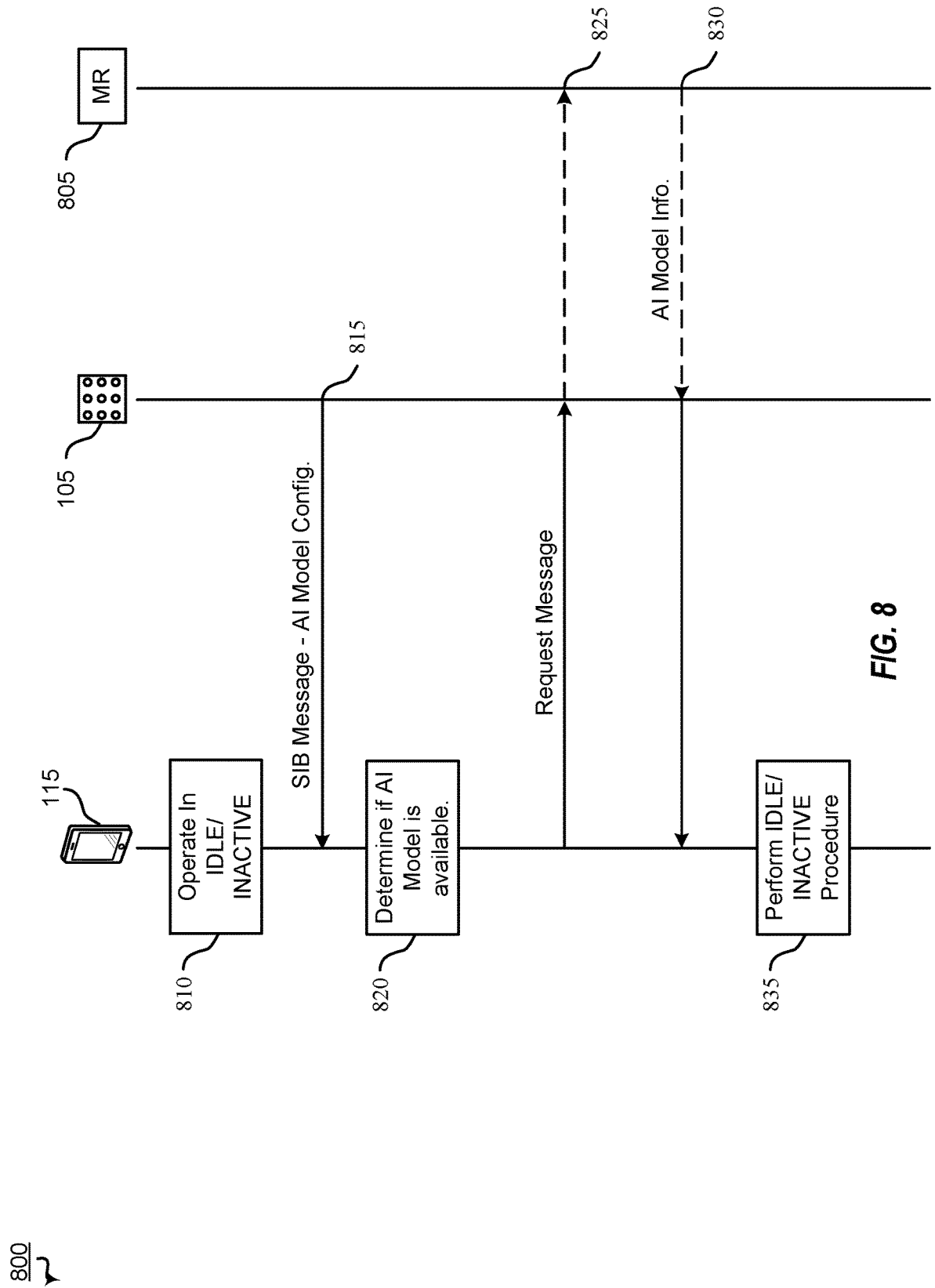
FIG. 8 is a ladder diagram illustrating another example wireless communication system that supports AI model-based enhancements for RRC IDLE and INACTIVE state operations according to one or more aspects.

Referring to FIG. 8, FIG. 8 is a ladder diagram 800 of RRC IDLE or INACTIVE state, SIB based configuration for RRC IDLE and INACTIVE state operations according to some aspects. In the example of FIG. 8, the ladder diagram illustrates a UE 115 and a network entity, such as base station 105 distinct or separate from (not collocated with) a model repository (MR) 805. In other examples and aspects, the network entity, such the base station 105 is collocated with the MR 805. The MR 805 may include or correspond to the MR 505, 605, or 705.

At 810, the UE 115 operates in a RRC IDLE or INACTIVE state. For example, the UE 115 is camped on the base station 105 (such as a gNB), and the base station 105 is a camped cell for the UE 115. The UE 115 may monitor broadcast transmissions from the base station 105.

At 815, the base station 105 transmits AI model configuration information in a SIB message to the UE 115. For example, the AI manager 439 of the base station 105 generates and transmits (e.g., broadcasts) a SIB message (e.g., AI model configuration message or configuration transmission 452) to the UE 115 which includes the AI model configuration information (e.g., 442) for one or more RRC IDLE or RRC INACTIVE state procedures. The AI model configuration information (e.g., 442) may include information for the AI model itself, for a corresponding report associated with the model, or both. The AI model configuration information may include settings, formats, transmission resources, etc.

The UE 115 may optionally determine an AI model based on the AI model configuration information, as described with reference to 515 of FIG. 5. At 820, the UE 115 determines whether the determined AI model is available. For example, the AI manager 415 of the UE 115 determines if the determined AI model (e.g., AI model information, such as input and output parameters) is available at the UE. If the AI model is available, the UE 115 may set the determined AI model for future RRC IDLE/INACTIVE state procedures and continue operating in the RRC IDLE or INACTIVE state. Alternatively, as shown in the example of FIG. 8, the UE 115 determines that the AI model is not available at the UE 115 and that the UE 115 is to obtain the AI model from the network (e.g., MR 805) or from another wireless communication device (e.g., a second UE).

At 825, the UE 115 transmits a model request message to the MR 805. For example, the AI manager 415 of the UE 115 generates and transmits an AI model request message to the base station 105 to download/retrieve the determine AI model which was indicated by the base station 105, and the base station 105 relays the AI model request message to the MR 805. The AI model request message may include or correspond to a PRACH preamble message (e.g., Msg 1), a RRC Connection Request (e.g., Msg 3), or a PRACH and data transmission (Msg A). In other examples and aspects, other messages may be used.

At 830, the base station 105 transmits an AI model message to the UE 115. For example, an AI model manager of the MR 805 generates and transmits a AI model transmission to the UE 115 which indicates the AI model information for the determined AI model. To illustrate, the UE 115 may acquire the AI model through techniques similar to the model request, such as MBS, sidelink, BCCH/SIB, NAS small data transfer. Alternatively, the UE 115 may receive the AI model from another UE via D2D communications.

At 835, the UE 115 may perform one or more operations for RRC IDLE and/or INACTIVE state processes. For example, the UE 115 sets the received AI model as an active model for one or more RRC IDLE and/or INACTIVE state processes and switches to an RRC IDLE or INACTIVE state at some time after receiving the AI model information, as described with reference to FIG. 5. The UE 115 may then perform one or more operations based on the AI model while in the RRC IDLE or INACTIVE state as described with reference to FIG. 5. Ins some implementations, the UE 115 may further evaluate and/or train the AI model, as described with reference to FIG. 5.

Thus, in the example in FIG. 8, the UE receives the AI model, for enhanced AI model-based RRC IDLE and INACTIVE state operations, while not in the RRC CONNECTED state. That is, the UE 115 receives the AI model configuration in a SI message while in the RRC IDLE or INACTIVE states.

Figure 9:
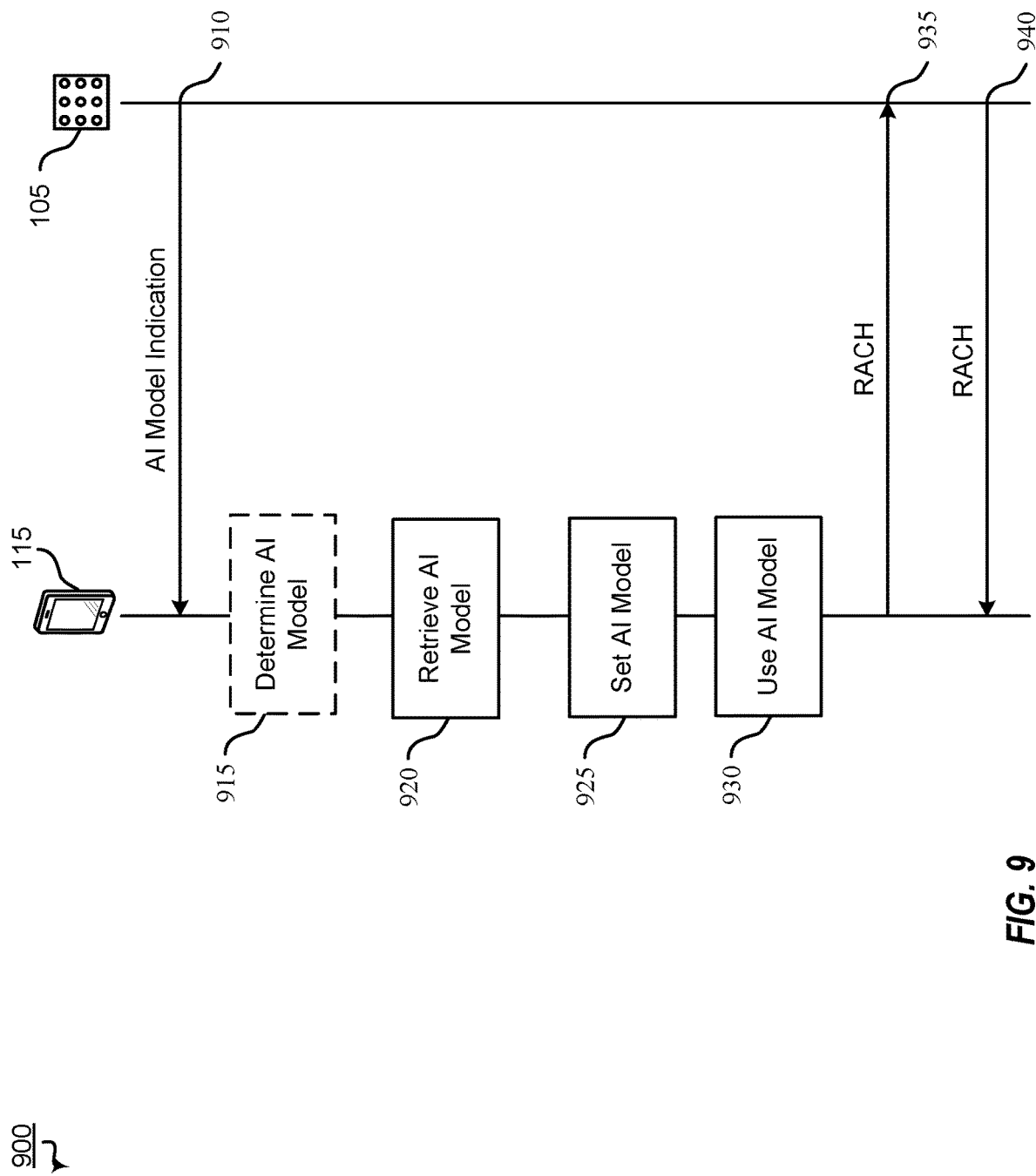
FIG. 9 is a ladder diagram illustrating another example wireless communication system that supports AI model-based enhancements for RRC IDLE and INACTIVE state operations according to one or more aspects.

Referring to FIG. 9, FIG. 9 is a ladder diagram 900 of UE based AI model determination for RRC IDLE and INACTIVE state operations according to some aspects. In the example of FIG. 9, the ladder diagram illustrates a UE 115 and a network entity, such as base station 105. In some examples and aspects, the network entity, such the base station 105 is collocated with a MR (not shown). In other examples and aspects, the network entity, such the base station 105 is distinct from a corresponding MR. The MR may include or correspond to the MR 505, 605, 705, or 805.

At 910, the base station 105 transmits an AI model indication message to the UE 115. For example, the AI manager 439 of the base station 105 generates and transmits (e.g., broadcasts) an AI model indication message (e.g., AI model configuration message or configuration transmission 452) to indicate to the UE 115 the AI model based operations for one or more RRC IDLE or RRC INACTIVE state procedures is configured. The AI model configuration information (e.g., 442) may not include information for the AI model itself.

At 915, the UE 115 determines an AI model responsive to the AI model indication message. For example, the UE 115 may select an AI model based on AI model configuration information stored at the UE 115. To illustrate, the UE 115 may select an AI model from a list of models available based on prioritization information, device information, network configuration, etc.

At 920, the UE 115 retrieves the selected AI model. For example, the AI manager 415 of the UE 115 retrieves the selected AI model, such as parameters thereof, from a model database or index stored in memory.

At 925, the UE 115 sets the AI model as an active model for one or more RRC IDLE and/or INACTIVE state processes. As an illustrative, non-limiting example the UE 115 sets the AI model as an active AI model for future RRC IDLE state cell reselection operations. In other implementations and aspects, the UE 115 may set the AI model for any other RRC IDLE or INACTIVE state processes described herein in addition to or in the alternative to the RRC IDLE state cell reselection operations.

In addition, the UE 115 may optionally switch from the CONNECTED state to the IDLE or INACTIVE states at some time after receiving the AI model message and AI model information.

At 930, the UE 115 uses the AI model information to performed one or more RRC IDLE or INACTIVE state operations. As an illustrative, non-limiting example the UE 115 sets the AI model as an active AI model for future RRC INACTIVE state cell reselection operations. In other implementations and aspects, the UE 115 may set the AI model for any other RRC IDLE or INACTIVE state operations described herein in addition to or in the alternative to the RRC INACTIVE state cell reselection operations.

In the example of FIG. 9, the UE 115 uses the AI model (e.g., the AI model information) to perform RACH operations for an IDLE/INACTIVE state. At 935, the UE 115 transmits a RACH message based on the AI model. For example, the AI manager 415 of the UE 115 generates and transmits a RACH message based on the AI model. To illustrate, the AI model information may indicate or adjust a cell selected for the RACH message.

At 940, the base station 105 may transmit a second RACH message responsive to the RACH message. For example, the base station 105 may transmit a second RACH message responsive to the RACH message, which was transmitted based on the AI model.

In some implementations, the UE 115 may select the AI model to use autonomously or independent of network input. In such implementations, the UE may have its own AI model (or multiple AI models) for IDLE and INACTIVE state operations. In some such implementations, the network (e.g., the base station 105) may indicate to the UE 115 whether the UE 115 is allowed to use AI model based operations for IDLE and INACTIVE state operations. Alternatively, the network (e.g., the base station 105) may indicate to the UE 115 whether the network is configured for AI model based operations for IDLE and INACTIVE state operations or a particular configuration therefore. As illustrate, non-limiting examples, the network may indicate such indications to the UE by a single bit in a RRCRelease message or by a single broadcast bit, such as a bit in a SIB message (e.g., SIB1). Upon receiving such indication, UE may use stored (e.g., pre-cached) or set AI model for AI based IDLE/INACTIVE state operations.

The UE 115 may train (e.g., adjust or update) one or more of the AI models. For example, the UE 115 may train an AI model for cell reselection. To illustrate, the UE 115 performs evaluations of IDLE/INACTIVE state procedures periodically, based on events, or both.

For periodic training, the AI model may be trained with measurements at a fixed epoch or interval. To illustrate, the UE 115 may perform measurements every N number of milliseconds and log the timing information of the measurement and adjustment coefficients (e.g., weights, deltas, gradients, models). The UE 115 then later reports the timing information, the adjustment coefficients, or both to the network, such as the base station 105 or the MR 905.

For event-triggered training, the AI model may be trained with measurements taken in response to a particular event or events. To illustrate, the UE 115 may perform measurements in response to an event and log or record the timing information and the adjustment coefficients (e.g., weights, deltas, gradients, models). The UE 115 may further record event information, such as an event ID, for the measurement. The UE 115 then later reports the timing information, the adjustment coefficients, or both to the network, such as the base station 105 or the MR 905.

In some implementations, the AI model training may be area-specific. For example, the UE 115 may determine to perform AI model training in a particular area. As another example, the UE 115 may determine to perform a particular type of training for a given area. When area based or area specific training is used, the area granularity may be per PLMN, RAN, RAT, frequency, or a combination thereof.

The training can be configured using RRC IDLE/INACTIVE state model training configuration, in a similar method as loggedMeasurementConfiguration, or model training configuration can be sent in a RRCReconfiguration message (similar to immediate MDT configuration). The UE 115 may save or store the training configuration in the variable for using the AI model in the RRC IDLE/INACTIVE state.

The network may receive the training information and aggregate received training information on the basis of time and/or event ID basis. The network may aggregate the received training information on a per device basis, on an area basis, on a time basis, on an event basis, or a combination thereof.

If the model configuration concerns model training, the configuration can additionally include, a MR address, a reporting interval and amount, a reporting Configuration, periodic or event-based reporting, etc., or a combination thereof.

The UE 115 may log AI model related measurements and report the measurements to the network. Such logging and reporting of AI model related measurements may enable enhanced logged measurement operations. For example, the UE 115 may utilize A logged measurement report to report UE estimations of different parameters for the AI model or models.

The evaluation and logging of AI model parameters and performance may enable achieving a better parametrization for AI model based IDLE/INACTIVE state procedures in the case UE switches AI models or reverts back to legacy method for handling IDLE/INACTIVE state operations (e.g., cell selection/reselection).

The evaluation and logging of AI model parameters and performance may enable achieving a better performance for other UEs which do not support AI based IDLE/INACTIVE operations, such as reduced capability UEs.

In the logged measurement report, UE 115 may also report Model IDs and performance (such as a different or delta between a traditional algorithm output and the AI model output) used by the UE 115 in the IDLE/INACTIVE states. In response to the logged measurement report, the network (e.g., the base station 105) may adjust or tune its parameters for different IDLE/INACTIVE state procedures based on the UE 115 estimations of the parameters.

Thus, in the example in FIG. 9, the UE may determines the model autonomously. The UE 115 may do so in response to a network indication that AI models may be used for one or more IDLE and INACTIVE state operations.

Figure 10:
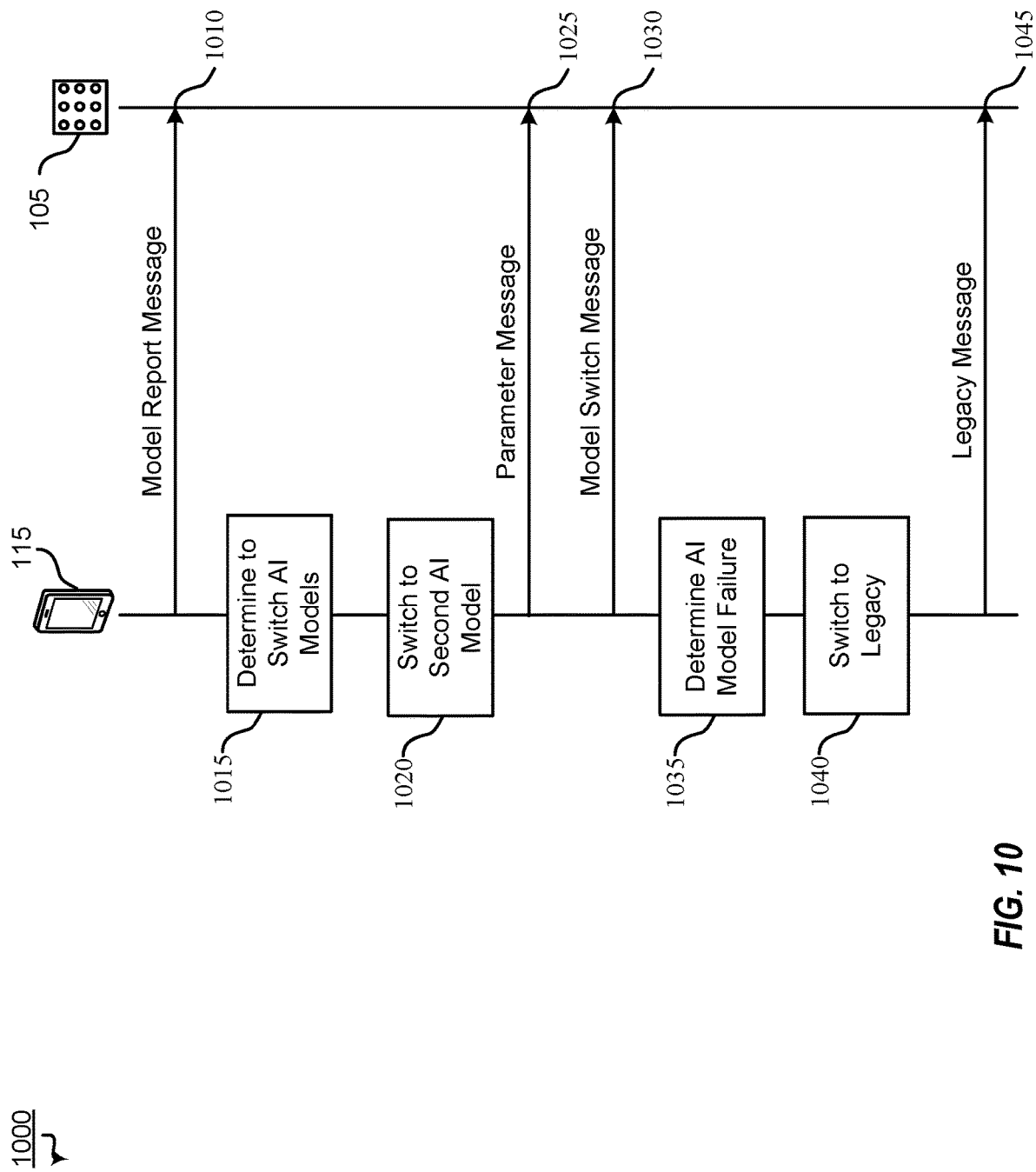
FIG. 10 is a ladder diagram illustrating another example wireless communication system that supports AI model-based enhancements for RRC IDLE and INACTIVE state operations according to one or more aspects.

Referring to FIG. 10, FIG. 10 is a ladder diagram 1000 of UE based AI model switching for RRC IDLE and INACTIVE state operations according to some aspects. In the example of FIG. 10, the ladder diagram illustrates a UE 115 and a network entity, such as base station 105. In some examples and aspects, the network entity, such the base station 105 is collocated with a MR (not shown). In other examples and aspects, the network entity, such the base station 105 is distinct from a corresponding MR. The MR may include or correspond to the MR 505, 605, 705, or 805.

At 1010, the UE 115 transmits an AI model report message to the base station 105. For example, the AI manager 415 of the UE 115 generates and transmits an AI model report message to indicate to the base station 105 AI model report information for one or more RRC IDLE or RRC INACTIVE state operations. The AI model report information (e.g., 442) may include information for the AI model itself, report information associated with the AI model (e.g., timing information and adjustment coefficients), or a combination thereof.

At 1015, the UE 115 determines to switch AI models. For example, the UE 115 may determine to select a second AI model based on the AI model report information, subsequent evaluation information, or a combination thereof. To illustrate, the UE 115 may select the second AI model from a list of models available based on prioritization information, device information, network configuration, etc. As another illustration, the UE 115 may retrieve or receive the second model from the network. The UE 115 may determine or select the model based on prioritization information, device information, network configuration, etc., or a combination thereof.

At 1020, the UE 115 switches to the selected second AI model. For example, the AI manager 415 of the UE 115 sets the selected AI model, such as parameters thereof, as an active AI model.

At 1025, the UE 115 optionally transmits a parameter modification message. The parameter modification message may adjust a parameter (e.g., change a value) or may update the parameters used (e.g., switch, add, subtract, etc. parameters used) for the AI model.

At 1030, the UE 115 optionally transmits a model switch message. Additionally, or alternatively to the parameter modification message, the UE 115 may generate and transmit a model switch message to the network to indicate a new model (e.g., the second AI model) is being used. The model switch message may include a request message (e.g., a request to use the second AI model in the future) or an indication message which indicates that the UE 115 will use or is already using the second AI model.

The UE 115 may optionally use the second AI model information to perform one or more RRC IDLE or INACTIVE state operations, as described above. For example, the UE 115 may use the second AI model information to perform cell selection or reselection operations.

At 1035, the UE 115 determines failure of the second AI model for IDLE/INACTIVE state operations. For example, the UE 115 may determine poor performance when using the second AI model for IDLE/INACTIVE state operations and optionally determines that switching to legacy operations may enable an increase in performance.

At 1040, the UE 115 switches to legacy operations for IDLE/INACTIVE state operations based on determining failure of the second AI model for IDLE/INACTIVE state operations. For example, the UE 115 may switch to the legacy operations based on poor performance of an AI model (e.g., model evaluations less than a threshold amount), frequent switching of AI models, a certain number of AI models used, performance of legacy operations, or a combination thereof.

At 1045, the UE 115 optionally transmits a legacy message to the base station 105 to indicate to use legacy operations for IDLE/INACTIVE state operations. For example, the UE 115 may transmit a message to the base station 105 to indicate it has or intends to use legacy operations (e.g., non-AI model based operations) for IDLE/INACTIVE state operations.

In some implementations, such as when multiple AI models are used or set, the UE my prioritize the multiple AI models and switch between the multiple AI models. For example, the network (e.g., base station 105) may configure multiple AI models for a particular IDLE/INACTIVE state operation. The network may additionally provide prioritization information which indicates a prioritization of different models for IDLE/INACTIVE state operations, if multiple models are configured at the UE 115.

In some implementations, the prioritization information may indicate prioritization of AI models per device type and based on UE AI (or ML) capabilities information. Prior to or in response to receiving the prioritization information, the UE 115 may report the AI models used in different scenarios or operations, such as by model IDs or NNF IDs. The different scenarios may include different areas, different times, different operating scenarios, etc.

In some implementations, the UE may upon acquisition of a new AI model from a third-party/non-network server (e.g., UE vendor model repository) notify the network of the new AI model. For example, the UE 115 may indicate the model ID or NNF ID of the new AI model to the network using dedicated RRC signaling or NAS signaling. In some such implementations, when model configuration, input and output parameters are inadequate or insufficient to accurately identify the AI model, the UE 115 may signal the appropriate "output parameters" to the network. Additionally, or alternatively, the UE 115 UE may request to modify the AI model configuration for achieving better performance. For example, the UE 115 may transmit an AI model configuration message indicating a request to adjust input and/or output parameters of the AI model to enhance performance.

The UE 115 and network (e.g., base station 105) may support model configuration and feedback over layer 2 (L2) and/or layer 3 (L3) relays. In the scenario where L2/L3 relay-initiated mobility is supported, the model IDs/NNF IDs used for IDLE/INACTIVE state procedure could be communicated to or by the L2/L3 relay. Additionally, or alternatively, the UE 115 may signal the supported AI model or models via sidelink or other D2D communications.

In some implementations, the UE 115 may determine a model failure based on detecting a condition or event, based on evaluating a parameter against a threshold, or a combination thereof. For example, the UE 115 may determine a model failure based on overheating, low computational power, degrading model performance, etc. Based on determining model failure the UE may revert to legacy methods for IDLE/INACTIVE operations or switch to an alternative AI model for IDLE/INACTIVE operations, if available.

In some implementations, the UE 115 may determine to switch between two AI models. For example, the UE 115 may determine to switch between models based on evaluating one or more criteria. Optionally, such criteria (e.g., parameters, thresholds, events, prioritization information, etc.) may be received from the network or stored at the UE 115. In some such implementations, the UE 115 may switch between available models (i.e., model and associated configuration/parameter sets) based on one or more of a mobility status, a mobility pattern, carrier frequency information (e.g., FR1, FR2, FR3, FR4, etc.), a validity area (RNA, tracking area, PLMN, RAT, Cell, etc.), a RRC state (IDLE or INACTIVE), an IDC scenario, a power status, a computational status, or network/RAN slice information.

Thus, in the example in FIG. 10, the UE 115 may evaluate and update the AI model for improved performance. Additionally, the UE 115 may report such evaluations and update to the AI model to the network to enable continued use of the AI model and network improvements.

Additionally, or alternatively, one or more operations of FIGS. 4-10 may be added, removed, substituted in other implementations. For example, in some implementations, the example steps of FIGS. 5 and 6 may be used together.

Figure 13:
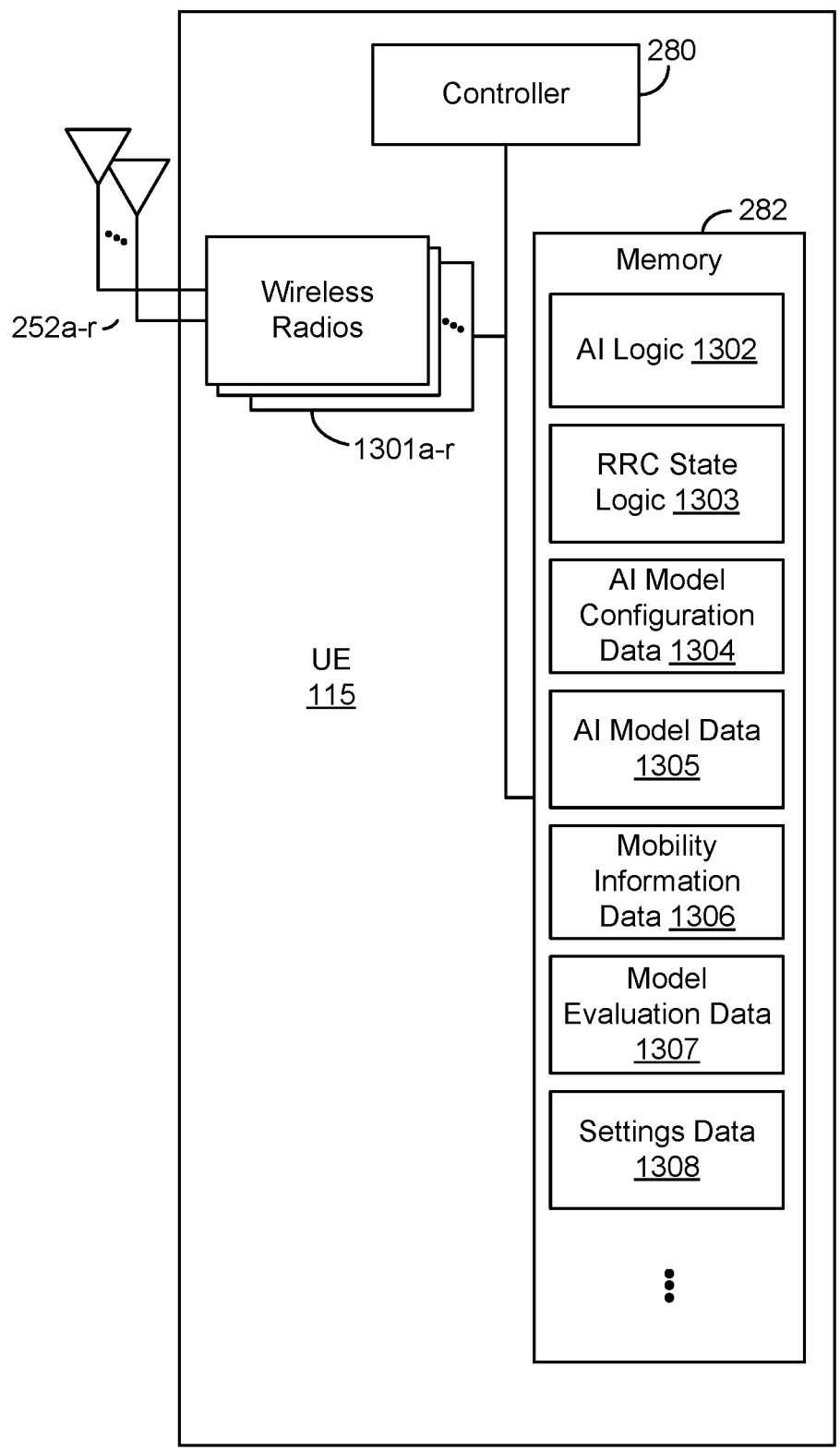
FIG. 13 is a block diagram of an example UE that supports AI model-based enhancements for RRC IDLE and INACTIVE state operations according to one or more aspects.

FIG. 11 is a flow diagram illustrating example blocks executed by a wireless communication device (e.g., a UE or base station) configured according to an aspect of the present disclosure. The example blocks will also be described with respect to UE 115 as illustrated in FIG. 13. FIG. 13 is a block diagram illustrating UE 115 configured according to one aspect of the present disclosure. UE 115 includes the structure, hardware, and components as illustrated for UE 115 of FIGS. 2 and/or 4. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1301*a-r* and antennas 252*a-r*. Wireless radios 1301*a-r* includes various components and hardware, as illustrated in FIG. 2 for UE 115, including modulator/demodulators 254*a-r*, MIMO detector 256, receive processor 258, transmit processor 264, and TX MIMO processor 266. As illustrated in the example of FIG. 13, memory 282 stores AI logic 1302, RRC State logic 1003, AI model configuration data 1304, AI model information data 1305, mobility information data 1306, model evaluation data 1307, and settings data 1308. The data (1302-1308) stored in the memory 282 may include or correspond to the data (406, 408, 442, 444) stored in the memory 404 of FIG. 4.

At block 1100, a wireless communication device, such as a UE, receives artificial intelligence (AI) model configuration information for IDLE/INACTIVE state procedures. For example, the UE 115 receives the configuration transmission 452 from the base station 105 which includes AI model configuration information 406, as described with reference to FIG. 4. The configuration transmission 452 may include or correspond to an RRC transmission or a SIB message, as described with reference to FIGS. 5-8. To illustrate, a receiver (e.g., receive processor 258 or receiver 412) of the UE 115 receives the configuration transmission 452 via wireless radios 1301*a-r* and antennas 252*a-r*.

At block 1101, the UE 115 retrieves an AI model for IDLE/INACTIVE state procedures based on the AI model configuration information. For example, the UE 115 determines the AI model indicated by the AI model configuration information and determines whether the UE 115 has the AI model. If the UE 115 has the AI model, the UE 115 may retrieve the AI model from memory, and optionally, the UE 115 may set the AI model for one or more IDLE/INACTIVE state procedures responsive to retrieving (or receiving) the AI model. The UE 115 may later use the AI model, such as upon transitioning to the IDLE or INACTIVE state. If the UE 115 does not have the AI model, the UE 115 may retrieve (e.g., download) the AI model from another device, such another UE or a network device. For example, the UE 115 may transmit the AI model request transmission 454 to the base station 105, or a model repository, as described with reference to FIGS. 4-10. The base station 105, or the model repository may respond with the AI model transmission 456 which includes the AI model data 408, as described with reference to FIGS. 4-10. To illustrate, a receiver (e.g., receive processor 258 or receiver 412) of the UE 115 receives the AI model transmission 456 via wireless radios 1301*a-r* and antennas 252*a-r*.

At block 1102, the UE 115 performs one or more IDLE/INACTIVE state procedures based on the AI model. For example, the AI manager 415 of the UE 115 may set the AI model information 408 as an active model for one or more IDLE and/or INACTIVE state procedures and perform one or more IDLE and/or INACTIVE state operations using the AI model 408 as described with reference to FIGS. 3B-10. As an illustrative example, performing one or more IDLE/INACTIVE state procedures based on the AI model may include transmitting a message based on the AI model indicated by the AI model configuration information, such as a RACH message for cell selection or reselection based on the AI model. For example, the UE 115 may use the AI model and mobility pattern information to adjust cell selection operations and select a particular cell, then the UE 115 may transmit a RACH message to the selected cell to transition to the CONNECTED state, as described with reference to FIGS. 4 and 5. To illustrate, a transmitter (e.g., transmit processor 264/TX MIMO processor 266 or transmitter 410) of the UE 115 transmits a message based on the AI model data 408 and the mobility information data 442 via wireless radios 1301*a-r* and antennas 252*a-r*.

The wireless communication device (e.g., UE or base station) may execute additional blocks (or the wireless communication device may be configured further perform additional operations) in other implementations. For example, the wireless communication device (e.g., the UE 115) may perform one or more operations described above. As another example, the wireless communication device (e.g., the UE 115) may perform one or more aspects as presented below.

In a first aspect, performing one or more IDLE/INACTIVE state procedures based on the AI model includes performing one or more of: public land mobile network (PLMN) selection procedures; stand-alone non-public network (SNPN) selection procedures;

RRC IDLE cell and reselection procedures; RRC INACTIVE cell selection and reselection procedures; enhanced or relaxed early measurement procedures; RACH optimization for initial access procedures; paging cycle periodicity enhancement procedures; enhanced SIB caching algorithm procedures; Unified Access Control (UAC) procedures; or enhanced on-demand SI request and response procedures.

In a second aspect, alone or in combination with the first aspect, the AI model configuration information indicates a Neural Network Function identifier (NNF ID) describing AI models and parameter sets, a single AI model ID and associated parameter sets, or a list of AI models and corresponding parameter sets.

In a third aspect, alone or in combination with one or more of the above aspects, retrieving the AI model includes: determining model ID information based on the AI model configuration information; identifying the AI model based on the model ID information; determining whether the wireless communication device has the AI model; and downloading the AI model from a model repository. Alternatively, the AI model may be downloaded or received from another UE using device-to-device (D2D) communications In a fourth aspect, alone or in combination with one or more of the above aspects, the AI model is downloaded over a U-plane or a C-plane by the wireless device in the RRC CONNECTED state, and wherein the model repository is collocated with a base station or separate from the base station.

In a fifth aspect, alone or in combination with one or more of the above aspects, downloading the AI models by the wireless device in INACTIVE state includes: transmitting a message to indicate the model ID, the message comprising a PRACH preamble message (e.g., Msg 1), a RRC Connection Request (e.g., Msg 3), or a PRACH and data transmission (Msg A); and receiving the AI model via multicast and broadcast services (MBS), sidelink communications, broadcast control channel (BCCH) messages, system information block (SIB) messages, non-access stratum (NAS) small data transfers, from the model repository.

In a sixth aspect, alone or in combination with one or more of the above aspects, the AI model configuration information for IDLE/INACTIVE state procedures is received in a RRC message or acquired in a System Information Block (SIB) message in a RRC CONNECTED state, and wherein the wireless communication device is in a RRC CONNECTED state when receiving the AI model configuration information and when retrieving the AI model.

In a seventh aspect, alone or in combination with one or more of the above aspects, the AI model is identified based on the model configuration sent to the wireless device using: dedicated radio resource control (RRC) signaling; a RRCReconfiguration message; or a System Information Block (SIB) message.

In an eighth aspect, alone or in combination with one or more of the above aspects, the AI model configuration information for IDLE/INACTIVE state procedures is received in a radio resource control (RRC) release message, and the wireless communication device further retrieves the AI model for IDLE/INACTIVE state procedures, wherein the wireless communication device is in a RRC IDLE/INACTIVE state when retrieving the AI model.

In a ninth aspect, alone or in combination with one or more of the above aspects, the AI model configuration information for IDLE/INACTIVE state procedures is received in a system information block (SIB) message, and wherein the wireless communication device is in a RRC IDLE/INACTIVE when receiving the SIB message and when retrieving the AI model.

In a tenth aspect, alone or in combination with one or more of the above aspects, the wireless communication device further receives AI model prioritization information, the AI model prioritization information indicating prioritization information per device type, based on AI capabilities, different scenarios (area or in-device co-existence (IDC) scenario), or a combination thereof.

In an eleventh aspect, alone or in combination with one or more of the above aspects, the wireless communication device is configured with multiple AI models for a particular IDLE/INACTIVE state procedure, and wherein the AI model configuration information indicates multiple AI models for a particular IDLE/INACTIVE state procedure.

In an twelfth aspect, alone or in combination with one or more of the above aspects, the wireless communication device further transmits prioritization information indicating AI model identification information (model IDs or NNF IDs) for different scenarios (e.g., different areas or different IDC scenarios).

In a thirteenth aspect, alone or in combination with one or more of the above aspects, the wireless communication device further receives a model indication message from a network via dedicated radio resource control (RRC) signaling or NAS signaling, the model indication message indicating model ID data or Neural Network Function identifier (NNF ID) data.

In a fourteenth aspect, alone or in combination with one or more of the above aspects, the AI model includes a standardized Neural Network Function identifier (NNF ID), one or more input parameters, one or more output parameters, and prioritization information, wherein the one or more input parameters include an in-device co-existence (IDC) condition, a thermal condition, a Network broadcasted system information (SI) for the cell-reselection, UE measured radio measurements (reference signal received power (RSRP)/reference signal received quality (RSRQ)), device speed, device pattern, device trajectory, device orientation, Network or radio access network (RAN) slice information, unified access control (UAC) and service categories supported by a base station, quality of service (QoS) requirements for uplink traffic to select or reselect a best cell prior to transition to a connected state, a transition rate between RRC states, or a combination thereof, and wherein the one or more output parameters include a target cell list for cell-reselection, a target cell list for measurements, UE estimation of cell-reselection parameters.

In a fifteenth aspect, alone or in combination with one or more of the above aspects, the wireless communication device further: determines at least one of the model configuration, an input parameter of the AI model, or an output parameter of the AI model is inadequate, insufficient or unsupported; determines an appropriate parameter set, Neural Network Function identifier (NNF ID), or model ID for an IDLE/INACTIVE state procedure; and transmits a model configuration update, the model configuration update (e.g., update request or indication) including an indication of at least one of an appropriate AI model configuration, an updated input parameter, or an updated output parameter.

In a sixteenth aspect, alone or in combination with one or more of the above aspects, the wireless communication device further transmits supported AI model information via a layer 2 (L2) relay, a layer (L3) relay, or a sidelink transmission.

In a seventeenth aspect, alone or in combination with one or more of the above aspects, the wireless communication device further: generates performance information for the AI model; determines a failure of the AI model based on the performance information; and switches from the AI model to a second AI model based on determining the failure of the AI model, or from the AI model to non-AI procedures (e.g., legacy procedures) for IDLE/INACTIVE state procedures based on determining the failure of the AI model.

In an eighteenth aspect, alone or in combination with one or more of the above aspects, the wireless communication device further switches from the AI model to a second AI model based one or more of: a mobility status; a mobility pattern; carrier frequencies information (based on FR1, FR2, FR3, or FR4); a validity areas (e.g., RNA, tracking area, PLMN, RAT, or Cell); a radio resource control (RRC) state (e.g., IDLE or INACTIVE); an in-device co-existence (IDC) scenario; a power status; a processor status; or network or radio access network (RAN) slice information.

In a nineteenth aspect, alone or in combination with one or more of the above aspects, the wireless communication device further: evaluates an efficiency of the AI model based on IDLE/INACTIVE procedures using a reference AI model to generate measurement data (e.g., estimations of different parameters); generates a report based on the measurement data; and transmits the report, wherein the report includes estimations of different parameters or Model IDs and a corresponding performance (e.g., a delta between a traditional algorithm output and the AI model output) used by UE in the IDLE/INACTIVE states.

In a twentieth aspect, alone or in combination with one or more of the above aspects, the wireless communication device further: receives AI model training configuration information; trains (e.g., adjusts) the AI model for IDLE/INACTIVE state procedures periodically based on the AI model training configuration information; logs timing information and adjustment coefficients (e.g., weights, models, deltas, gradients, etc.) used for training the AI model to generate logged AI model training information; and reports the logged AI model training information.

In a twenty-first aspect, alone or in combination with one or more of the above aspects, the wireless communication device further: receives AI model training configuration information; identifies an event for AI model training based on the AI model training configuration information; trains (e.g., adjusts) the AI model for IDLE/INACTIVE state procedures in response to the identified event based on the AI model training configuration information; logs timing information and adjustment coefficients used for training the AI model to generate logged AI model training information; and reports the logged AI model training information.

In a twenty-second aspect, alone or in combination with one or more of the above aspects, the wireless communication device further receives a radio resource control (RRC) message indicating AI model training configuration information, wherein the RRC message is a LoggedMeasurementConfiguration message or a RRCReconfiguration message.

In a twenty-third aspect, alone or in combination with one or more of the above aspects, the wireless communication device further logs adjustment coefficients for training the AI model and reports the adjustment coefficients to the network, where the network aggregates the adjustment coefficients for the wireless communication device on the basis of time and event ID. The network may aggregate adjustment coefficients for multiple wireless communication devices (e.g., multiple UEs).

In a twenty-fourth aspect, alone or in combination with one or more of the above aspects, the wireless communication device further transmits the AI model to a second wireless communication device via sidelink transmission.

In an additional aspect, alone or in combination with one or more of the above aspects, a method of wireless communication comprises: receiving, by a wireless communication device, artificial intelligence (AI) model configuration information for IDLE/INACTIVE state procedures; retrieving, by the wireless communication device, AI models for IDLE/INACTIVE state procedures based on the AI model configuration information; and selecting, by the wireless communication device, an AI model for IDLE/INACTIVE state procedures based on priorities of configured models and UE mobility, area, power, and other status, such as described with reference to FIGS. 4 and 10.

In an additional aspect, alone or in combination with one or more of the above aspects, a method of wireless communication comprises: receiving, by a wireless communication device, an indication for usage of artificial intelligence (AI) based IDLE/INACTIVE state procedures; determining, by the wireless communication device, an AI model for IDLE/INACTIVE state procedures based on based on wireless communication device capability; retrieving, by the wireless communication device, the determined AI model from memory; and setting, by the wireless communication device, the retrieved AI model for IDLE/INACTIVE state procedures, such as described with reference to FIG. 9.

Accordingly, wireless communication devices may perform enhanced AI model-based RRC IDLE and INACTIVE state configuration and operations for wireless communication devices. By performing enhanced AI model-based RRC IDLE and INACTIVE state configuration and operations enables improved RRC and IDLE state operations (e.g., improved cell selection and reselection) and thus, enhanced UE and network performance by increasing throughput and reducing errors and latency.

Figure 14:
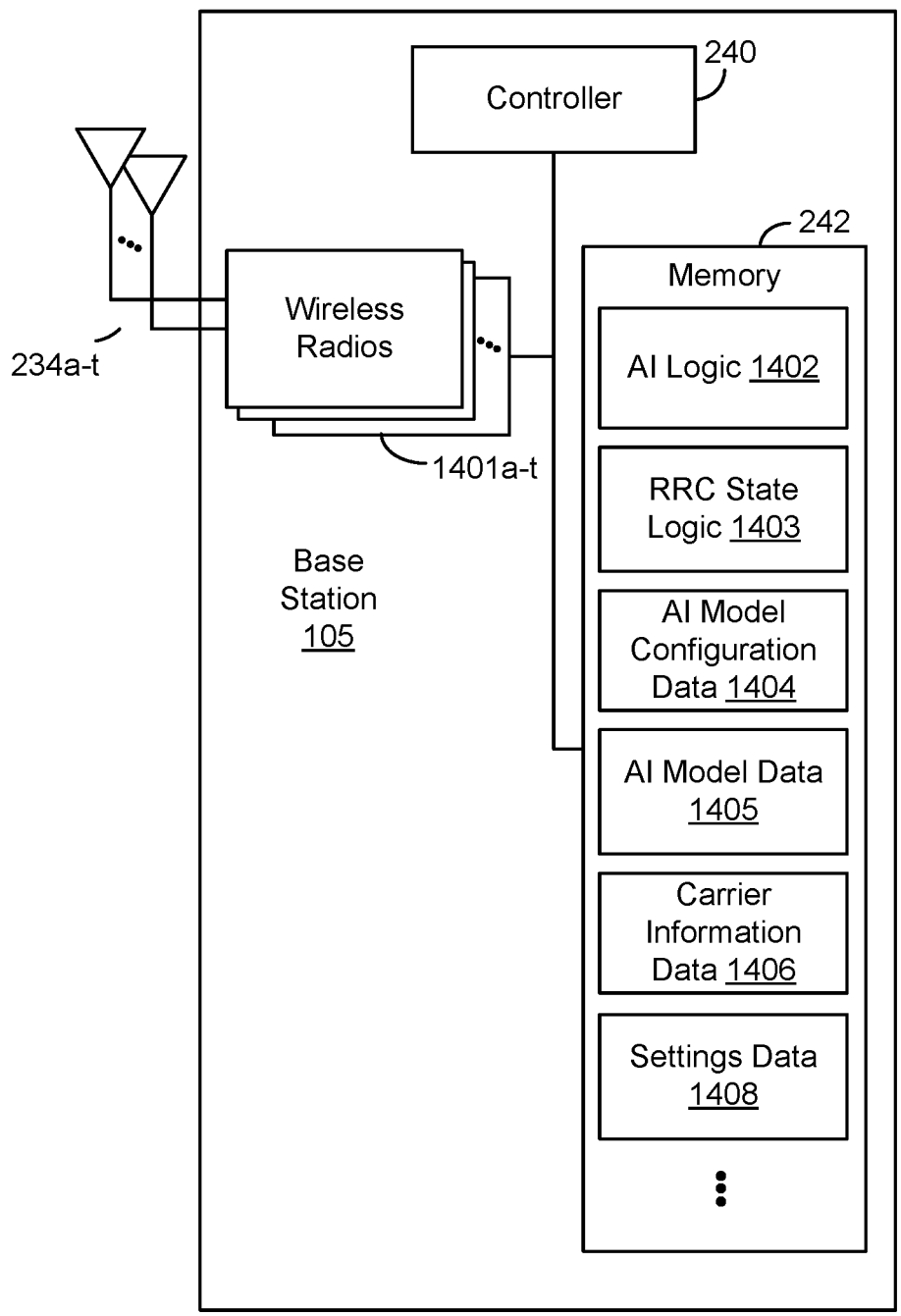
FIG. 14 is a block diagram of an example base station that supports AI model-based enhancements for RRC IDLE and INACTIVE state operations according to one or more aspects.

FIG. 12 is a flow diagram illustrating example blocks executed wireless communication device (e.g., a UE or base station) configured according to an aspect of the present disclosure. The example blocks will also be described with respect to base station 105 as illustrated in FIG. 14. FIG. 14 is a block diagram illustrating base station 105 configured according to one aspect of the present disclosure. Base station 105 includes the structure, hardware, and components as illustrated for base station 105 of FIGS. 2 and/or 4. For example, base station 105 includes controller/processor 280, which operates to execute logic or computer instructions stored in memory 282, as well as controlling the components of base station 105 that provide the features and functionality of base station 105. Base station 105, under control of controller/processor 280, transmits and receives signals via wireless radios 1401a-t and antennas 234a-t. Wireless radios 1401a-t includes various components and hardware, as illustrated in FIG. 2 for base station 105, including modulator/demodulators 232a-r, MIMO detector 236, receive processor 238, transmit processor 220, and TX MIMO processor 230. As illustrated in the example of FIG. 14, memory 282 stores AI logic 1402, RRC state logic 1403, AI model configuration data 1404, AI model data 1405, carrier information data 1406, and settings data 1408.

At block 1400, a wireless communication device, such as a network device (e.g., a base station 105), transmits artificial intelligence (AI) model configuration information for IDLE/INACTIVE state procedures. For example, the base station 105 transmits the configuration transmission 452, which includes AI model configuration information 406, as described with reference to FIGS. 4-8. To illustrate, a transmitter (e.g., transmit processor 220/TX MIMO processor 230 or transmitter 434) of the base station 105 transmits the configuration transmission 452, including AI model configuration information 406, via wireless radios 1401a-t and antennas 234a-t. The configuration transmission 452 may include or correspond to an RRC transmission or a SIB message, as described with reference to FIGS. 5-8. As an alternative example, the base station 105 transmits a message (e.g., message 448 or 450) indicating to perform AI model-based RRC IDLE/INACTIVE state procedures, as described with reference to FIGS. 4 and 5. In such implementations, a receiving device (e.g., the UE 115) may determine which AI model to use based on device capabilities and configurations.

At block 1401, the wireless communication device transmits an AI model for IDLE/INACTIVE state procedures based on the AI model configuration information. For example, the base station 105 or the MR transmits the AI model transmission 456 including the AI model data 408, as described with reference to FIGS. 4-8. To illustrate, a transmitter (e.g., transmit processor 220/TX MIMO processor 230 or transmitter 434) of the base station 105 transmits the AI model transmission 456 via wireless radios 1401a-t and antennas 234a-t for a particular transmission between two UEs. The AI model transmission 456 may include or correspond to a RRC transmission, a U-plane communication, a C-plane communication, a RACH transmission, or another transmission, as described with reference to FIGS. 4-10.

The wireless communication device (e.g., such as a UE or base station) may execute additional blocks (or the wireless communication device may be configured further perform additional operations) in other implementations. For example, the wireless communication device may perform one or more operations described above. As another example, the wireless communication device may perform one or more aspects as described with reference to FIGS. 4-10.

In a first aspect, the wireless communication device further: receives a report based on measurement data; adjusts AI model parameters based on the report; and transmits a message indicating the adjusted AI model parameters.

In a second aspect, alone or in combination with the first aspect, the wireless communication device further transmits AI model prioritization information. The AI model prioritization information indicates prioritization information per device type, based on AI capabilities, different scenarios (area or IDC scenario), or a combination thereof.

In a third aspect, alone or in combination with one or more of the above aspects, the AI model configuration information indicates one or more of: a validity area of the AI model configuration, a validity time of the AI model configuration, an AI Model ID, a list of AI model IDs, an Neural Network Function identifier (NNF ID), a list of NNF IDs, associated parameter sets, an Event ID for model inference if inference is configured as event triggered, periodicity of inference if inference is configured as periodic, or a combination thereof.

In a fourth aspect, alone or in combination with one or more of the above aspects, the AI model configuration information indicates model training information, the model training information comprising a model repository (MR) address, a reporting interval and amount, a reporting configuration, periodic reporting, event-based reporting, or a combination thereof.

In a fifth aspect, alone or in combination with one or more of the above aspects, the AI model includes UE speed information, UE mobility pattern information, or both Accordingly, wireless communication devices may perform enhanced AI model-based RRC IDLE and INACTIVE state configuration and operations for wireless communication devices. By performing enhanced AI model-based RRC IDLE and INACTIVE state configuration and operations enables improved RRC and IDLE state operations (e.g., improved cell selection and reselection) and thus, enhanced UE and network performance by increasing throughput and reducing errors and latency.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-14 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication comprising:
   receiving, by a wireless communication device, artificial intelligence (AI) model configuration information for IDLE/INACTIVE state procedures;
   retrieving, by the wireless communication device in an IDLE/INACTIVE state, an AI model for IDLE/INACTIVE state procedures from an external device based on the AI model configuration information; and
   performing, by the wireless communication device, one or more IDLE/INACTIVE state procedures based on the AI model.

2. The method of claim 1, wherein performing the one or more IDLE/INACTIVE state procedures based on the AI model includes performing one or more of:
   public land mobile network (PLMN) selection procedures;
   stand-alone non-public network (SNPN) selection procedures;
   radio resource control (RRC) IDLE cell and reselection procedures;
   RRC INACTIVE cell selection and reselection procedures;
   enhanced or relaxed early measurement procedures;
   random access channel (RACH) optimization for initial access procedures;
   paging cycle periodicity enhancement procedures;
   enhanced system information block (SIB) caching algorithm procedures;
   Unified Access Control (UAC) procedures; or
   enhanced on-demand system information (SI) request and response procedures.

3. The method of claim 1, wherein the AI model configuration information indicates a Neural Network Function identifier (NNF ID) describing AI models and parameter sets, a single AI model ID and associated parameter sets, or a list of AI models and corresponding parameter sets.

4. The method of claim 1, wherein retrieving the AI model in the IDLE/INACTIVE state includes:
   determining model ID information based on the AI model configuration information;
   identifying the AI model based on the model ID information;
   determining whether the wireless communication device has the AI model; and
   downloading the AI model from a model repository in the IDLE/INACTIVE state.

5. The method of claim 4, wherein the model repository is collocated with a base station or separate from the base station.

6. The method of claim 4, wherein downloading the AI model from the model repository in the IDLE/INACTIVE state includes:
   transmitting a message to indicate a model ID of AI model, the message comprising a physical random access channel (PRACH) preamble message, a radio resource control (RRC) Connection Request, or a PRACH and data transmission; and
   receiving, in the IDLE/INACTIVE state, the AI model via one of multicast and broadcast services (MBS), sidelink communications, broadcast control channel (BCCH) messages, system information block (SIB) messages, or non-access stratum (NAS) small data transfers, from the model repository.

7. The method of claim 1, wherein the AI model configuration information for IDLE/INACTIVE state procedures is received in a radio resource control (RRC) message or acquired in a System Information Block (SIB) message in a RRC CONNECTED state, and wherein the wireless communication device is in the RRC CONNECTED state when receiving the AI model configuration information.

8. The method of claim 1, wherein the AI model is identified based on the AI model configuration information transmitted to the wireless communication device using:
   dedicated radio resource control (RRC) signaling;
   a RRCReconfiguration message; or
   a System Information Block (SIB) message.

9. The method of claim 1, wherein the AI model configuration information for IDLE/INACTIVE state procedures is received in a radio resource control (RRC) release message, and further comprising:
   retrieving the AI model for the IDLE/INACTIVE state procedures in a RRC IDLE/INACTIVE state.

10. The method of claim 1, wherein the AI model configuration information for IDLE/INACTIVE state procedures is received in a system information block (SIB) message, and wherein the wireless communication device is in a radio resource control (RRC) IDLE or INACTIVE state when receiving the SIB message and when retrieving the AI model.

11. The method of claim 1, further comprising:
   receiving, by the wireless communication device, AI model prioritization information, the AI model prioritization information indicating prioritization information per device type, based on AI capabilities, different scenarios, or a combination thereof.

12. The method of claim 1, wherein the wireless communication device is configured with multiple AI models for a particular IDLE/INACTIVE state procedure, and wherein the AI model configuration information indicates multiple AI models for a particular IDLE/INACTIVE state procedure.

13. An apparatus for wireless communication comprising:
   a processor; and
   a memory coupled to the processor, the memory storing instructions which when executed by the processor cause the processor to:
   receiving, by a wireless communication device, artificial intelligence (AI) model configuration information for IDLE/INACTIVE state procedures;

retrieving, by the wireless communication device in an IDLE/INACTIVE state, an AI model for IDLE/INACTIVE state procedures from an external device based on the AI model configuration information; and performing, by the wireless communication device, one or more IDLE/INACTIVE state procedures based on the AI model.

14. The apparatus of claim 13, further comprising:
transmitting, by the wireless communication device, prioritization information for AI models indicating AI model identification information for different scenarios.

15. The apparatus of claim 13, further comprising:
receiving, by the wireless communication device, a model indication message from a network via dedicated radio resource control (RRC) signaling or non-access stratum (NAS) signaling, the model indication message indicating AI model ID data or Neural Network Function identifier (NNF ID) data.

16. The apparatus of claim 13, wherein the AI model includes a standardized Neural Network Function identifier (NNF ID), one or more input parameters, one or more output parameters, and prioritization information, wherein the one or more input parameters include an in-device co-existence (IDC) condition, a thermal condition, a network broadcasted system information (SI) for cell reselection, UE measured radio measurements, device speed, device pattern, device trajectory, device orientation, Network or radio access network (RAN) slice information, unified access control (UAC) and service categories supported by a base station, quality of service (QOS) requirements for uplink traffic to select or reselect a best cell prior to transition to a connected state, a transition rate between radio resource control (RRC) states, or a combination thereof, and wherein the one or more output parameters include a target cell list for cell reselection, a target cell list for measurements, or an estimation of cell reselection parameters.

17. The apparatus of claim 13, further comprising:
determining, by the wireless communication device, at least one of a configuration of the AI model, an input parameter of the AI model, or an output parameter of the AI model is inadequate, insufficient or unsupported;
determining, by the wireless communication device, an appropriate parameter set, Neural Network Function identifier (NNF ID), or model ID for an IDLE/INACTIVE state procedure; and
transmitting, by the wireless communication device, a model configuration update, the model configuration update including an indication of at least one of an appropriate AI model configuration, an updated input parameter, or an updated output parameter.

18. The apparatus of claim 13, further comprising:
transmitting, by the wireless communication device, supported AI model information via a layer 2 (L2) relay, a layer (L3) relay, or a sidelink transmission.

19. The apparatus of claim 13, further comprising:
generating, by the wireless communication device, performance information for the AI model;
determining, by the wireless communication device, a failure of the AI model based on the performance information; and
switching, by the wireless communication device, from the AI model to a second AI model based on determining the failure of the AI model, or from the AI model to non-AI procedures for IDLE/INACTIVE state procedures based on determining the failure of the AI model.

20. The apparatus of claim 13, further comprising:
switching, by the wireless communication device, from the AI model to a second AI model based on one or more of:
a mobility status;
a mobility pattern;
carrier frequencies information;
validity area information;
a radio resource control (RRC) state;
an in-device co-existence (IDC) scenario;
a power status;
a processor status; or
network or radio access network (RAN) slice information.

21. The apparatus of claim 13, further comprising:
evaluating, by the wireless communication device, efficiency of the AI model based on IDLE/INACTIVE procedures using a reference AI model to generate measurement data;
generating, by the wireless communication device, a report based on the measurement data; and
transmitting, by the wireless communication device, the report, wherein the report includes estimations of different parameters or AI model IDs and a corresponding performance of the wireless communication device in the IDLE/INACTIVE state procedures.

22. The apparatus of claim 13, further comprising:
receiving, by the wireless communication device, AI model training configuration information;
training, by the wireless communication device, the AI model for IDLE/INACTIVE state procedures periodically based on the AI model training configuration information;
logging, by the wireless communication device, timing information and adjustment coefficients used for training the AI model to generate logged AI model training information; and
reporting, by the wireless communication device, the logged AI model training information.

23. The apparatus of claim 13, further comprising:
receiving, by the wireless communication device, AI model training configuration information;
identifying, by the wireless communication device, an event for AI model training based on the AI model training configuration information;
training, by the wireless communication device, the AI model for IDLE/INACTIVE state procedures in response to the identified event based on the AI model training configuration information;
logging, by the wireless communication device, timing information and adjustment coefficients used for training the AI model to generate logged AI model training information; and
reporting, by the wireless communication device, the logged AI model training information.

24. A method of wireless communication comprising:
transmitting, by a wireless communication device, artificial intelligence (AI) model configuration information for IDLE/INACTIVE state procedures; and
transmitting, by the wireless communication device, an AI model for IDLE/INACTIVE state procedures based on the AI model configuration information and to a device in an IDLE/INACTIVE state.

25. The method of claim 24, further comprising:
receiving, by the wireless communication device, a report based on measurement data;
adjusting, by the wireless communication device, AI model parameters based on the report; and
transmitting, by the wireless communication device, a message indicating the adjusted AI model parameters.

26. The method of claim 24, further comprising:
transmitting, by the wireless communication device, AI model prioritization information, the AI model prioritization information indicating prioritization information per device type, based on AI capabilities, different scenarios, or a combination thereof.

27. An apparatus for wireless communication comprising:
a processor; and
a memory coupled to the processor, the memory storing instructions which when executed by the processor cause the processor to:
transmitting, by a wireless communication device, artificial intelligence (AI) model configuration information for IDLE/INACTIVE state procedures; and
transmitting, by the wireless communication device, an AI model for IDLE/INACTIVE state procedures based on the AI model configuration information and to a device in an IDLE/INACTIVE state.

28. The apparatus of claim 27, wherein the AI model configuration information indicates one or more of: a validity area of the AI model, a validity time of the AI model, an AI Model ID of the AI model, a list of AI model IDs, an Neural Network Function identifier (NNF ID), a list of NNF IDs, associated parameter sets, an Event ID for model inference if configured as event triggered, periodicity of inference if configured as periodic, or a combination thereof.

29. The apparatus of claim 27, wherein the AI model configuration information indicates model training information, the model training information comprising a model repository (MR) address, a reporting interval and amount, a reporting configuration, periodic reporting, event-based reporting, or a combination thereof, and wherein the AI model includes UE speed information, UE mobility pattern information, or both.

30. The apparatus of claim 13, wherein the AI model includes mobility pattern information that indicates historical movement data of the apparatus, and wherein the external device is a base station or a model repository.

* * * * *